(12) United States Patent
Green et al.

(10) Patent No.: US 11,240,299 B2
(45) Date of Patent: *Feb. 1, 2022

(54) METHODS AND SYSTEMS FOR SECURE INFORMATION STORAGE AND DELIVERY

(71) Applicant: Greenfly, Inc., Santa Monica, CA (US)

(72) Inventors: Shawn David Green, Corona del Mar, CA (US); Daniel Brian Kirschner, Santa Monica, CA (US); Marshall Raymond Greer, III, Santa Monica, CA (US)

(73) Assignee: Greenfly, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,706

(22) Filed: Jun. 16, 2020

(65) Prior Publication Data

US 2021/0126967 A1 Apr. 29, 2021

Related U.S. Application Data

(63) Continuation of application No. 16/389,743, filed on Apr. 19, 2019, now Pat. No. 10,693,956.

(51) Int. Cl.
*G06F 15/16* (2006.01)
*H04L 29/08* (2006.01)
*H04L 29/06* (2006.01)

(52) U.S. Cl.
CPC ...... *H04L 67/1046* (2013.01); *H04L 63/0428* (2013.01); *H04L 65/4046* (2013.01); *H04L 67/1061* (2013.01)

(58) Field of Classification Search
USPC .......... 709/204, 201, 202, 203, 206
See application file for complete search history.

(56) References Cited

U.S. PATENT DOCUMENTS

| | | |
|---|---|---|
| 6,938,005 B2 | 8/2005 | Iverson et al. |
| 7,577,979 B2 | 8/2009 | Feinleib et al. |

(Continued)

OTHER PUBLICATIONS http://www.filmindependent.org/blogs/check-out-chideo-its-a-cool-idea-for-a-good-cause/#.Ul485IN0Azg, "Check Out Chideo: It's a Cool Idea for a Good Cause," Sep. 2013.

(Continued)

*Primary Examiner* — Lan Dai T Truong
(74) *Attorney, Agent, or Firm* — Knobbe, Martens, Olson & Bear LLP

(57) ABSTRACT

A group definition is received via a network interface. Communications are transmitted to destinations, the communications comprising an invitation to associate with the a content sharing group. Authentication data associated with users that accept the invention is encrypted. The accepting users are associated with the content sharing group. A content gallery definition is received. A communication is received that the content gallery is to be shared with the content sharing group. The content gallery is caused to be instantiated on devices of users associated with the group. A content request for the content sharing group is received and the content request is transmitted accordingly to users associated with the group. A content item is received in response the request and the content item is transmitted to user devices associated with the group and enabled to appear in instantiations of the content gallery on the user devices.

20 Claims, 21 Drawing Sheets

(56) References Cited

U.S. PATENT DOCUMENTS

| | | |
|---|---|---|
| 7,757,254 B2 | 7/2010 | Shoff et al. |
| 7,809,603 B2 | 10/2010 | Steelberg et al. |
| 8,024,467 B2 | 9/2011 | Humphrey et al. |
| 8,032,470 B1 | 10/2011 | Heidenreich |
| 8,539,542 B1 | 9/2013 | Elhag |
| 8,607,295 B2 | 12/2013 | Bhatia et al. |
| 8,612,243 B2 | 12/2013 | McGill et al. |
| 8,693,848 B1 | 4/2014 | Pacor |
| 8,782,140 B1 | 7/2014 | Green |
| 8,819,719 B1 | 8/2014 | Chen et al. |
| 8,943,140 B1 | 1/2015 | Kothari |
| 9,015,251 B2 | 4/2015 | Green |
| 9,063,972 B1 | 6/2015 | Marra |
| 9,081,823 B2 | 7/2015 | Luo |
| 9,104,892 B2 | 8/2015 | Chevalier |
| 9,280,610 B2 | 3/2016 | Gruber |
| 9,300,620 B2 | 3/2016 | Bradley |
| 9,348,823 B2 | 5/2016 | Green |
| 9,461,958 B1 | 10/2016 | Green et al. |
| 9,762,629 B1 | 9/2017 | Bhargava |
| 9,942,189 B2 | 4/2018 | Green et al. |
| 10,154,001 B2 | 12/2018 | Green et al. |
| 10,257,301 B1 | 4/2019 | Giordano |
| 2002/0016969 A1 | 2/2002 | Kimble |
| 2002/0073177 A1 | 6/2002 | Clark et al. |
| 2003/0229900 A1 | 12/2003 | Reisman |
| 2006/0174316 A1 | 8/2006 | Gregorian et al. |
| 2006/0253542 A1 | 11/2006 | McCausland et al. |
| 2007/0089151 A1 | 4/2007 | Moore et al. |
| 2007/0162566 A1 | 7/2007 | Desai et al. |
| 2008/0103906 A1 | 5/2008 | Singh |
| 2008/0120324 A1 | 5/2008 | Davis |
| 2008/0147741 A1 | 6/2008 | Gonen |
| 2008/0177752 A1 | 7/2008 | Kulkarni et al. |
| 2008/0209480 A1 | 8/2008 | Eide et al. |
| 2008/0244681 A1 | 10/2008 | Gossweiler et al. |
| 2008/0247543 A1 | 10/2008 | Mick et al. |
| 2009/0044235 A1 | 2/2009 | Davidson |
| 2009/0060289 A1 | 3/2009 | Shah et al. |
| 2009/0089294 A1 | 4/2009 | Davis et al. |
| 2009/0148124 A1 | 6/2009 | Athsani |
| 2009/0172129 A1 | 7/2009 | Singh et al. |
| 2009/0204885 A1 | 8/2009 | Ellsworth et al. |
| 2009/0210291 A1 | 8/2009 | Safar |
| 2009/0210808 A1 | 8/2009 | West |
| 2009/0328087 A1 | 12/2009 | Higgins et al. |
| 2010/0088394 A1 | 4/2010 | Barbieri et al. |
| 2010/0293598 A1 | 11/2010 | Collart et al. |
| 2011/0004831 A1 | 1/2011 | Steinberg |
| 2011/0035503 A1 | 2/2011 | Zaid |
| 2011/0082808 A1 | 4/2011 | Beykpour et al. |
| 2011/0106835 A1 | 5/2011 | Lauridsen |
| 2011/0126148 A1* | 5/2011 | Krishnaraj .......... G06F 3/04842 715/784 |
| 2011/0173214 A1 | 7/2011 | Karim |
| 2011/0225239 A1 | 9/2011 | Kansai |
| 2011/0225508 A1 | 9/2011 | Steelberg et al. |
| 2011/0264521 A1 | 10/2011 | Straka |
| 2011/0264599 A1 | 10/2011 | Dalton |
| 2011/0276423 A1 | 11/2011 | Davidson |
| 2011/0289157 A1 | 11/2011 | Pirnazar |
| 2011/0311205 A1 | 12/2011 | McClanahan |
| 2012/0004956 A1 | 1/2012 | Huston |
| 2012/0042263 A1 | 2/2012 | Rapaport |
| 2012/0072835 A1 | 3/2012 | Gross |
| 2012/0096041 A1 | 4/2012 | Rao |
| 2012/0123811 A1 | 5/2012 | Socolof |
| 2012/0130807 A1 | 5/2012 | Steelberg et al. |
| 2012/0185238 A1 | 7/2012 | Bhatti |
| 2012/0192225 A1 | 7/2012 | Harwell et al. |
| 2012/0192239 A1 | 7/2012 | Harwell |
| 2012/0233000 A1 | 9/2012 | Fisher |
| 2012/0233646 A1 | 9/2012 | Coniglio et al. |
| 2012/0236201 A1 | 9/2012 | Larsen |
| 2012/0254301 A1 | 10/2012 | Fiero |
| 2012/0272164 A1 | 10/2012 | Polonsky |
| 2012/0304237 A1 | 11/2012 | Harwell et al. |
| 2012/0316962 A1 | 12/2012 | Rathod |
| 2012/0317227 A1 | 12/2012 | Bettinger |
| 2013/0014136 A1 | 1/2013 | Bhatia |
| 2013/0080565 A1 | 3/2013 | van Coppenolle |
| 2013/0086185 A1 | 4/2013 | Desmarais |
| 2013/0086631 A1 | 4/2013 | Archer et al. |
| 2013/0132847 A1 | 5/2013 | Chen |
| 2013/0159295 A1 | 6/2013 | Gross |
| 2013/0166649 A1 | 6/2013 | Atzmon |
| 2013/0226675 A1 | 8/2013 | Senra |
| 2013/0226708 A1 | 8/2013 | Good et al. |
| 2013/0226758 A1 | 8/2013 | Reitan |
| 2013/0227384 A1 | 8/2013 | Good et al. |
| 2013/0227596 A1 | 8/2013 | Pettis et al. |
| 2013/0238444 A1 | 9/2013 | Munaco |
| 2013/0254804 A1 | 9/2013 | Diaz Perez |
| 2013/0268828 A1 | 10/2013 | Bucchieri |
| 2013/0282839 A1 | 10/2013 | Alcala |
| 2013/0283301 A1 | 10/2013 | Avedissian |
| 2013/0304527 A1 | 11/2013 | Santos, III |
| 2013/0304575 A1 | 11/2013 | Fetyko |
| 2013/0304820 A1 | 11/2013 | Vasquez |
| 2013/0311906 A1 | 11/2013 | Mackin |
| 2013/0312049 A1 | 11/2013 | Niyogi et al. |
| 2013/0321388 A1 | 12/2013 | Locke |
| 2013/0332213 A1 | 12/2013 | Heggen |
| 2013/0332603 A1 | 12/2013 | Hutten |
| 2013/0346172 A1 | 12/2013 | Wu |
| 2014/0013228 A1 | 1/2014 | Hutten |
| 2014/0019882 A1 | 1/2014 | Chew |
| 2014/0047074 A1 | 2/2014 | Chung |
| 2014/0082645 A1 | 3/2014 | Stern |
| 2014/0095637 A1 | 4/2014 | Cropper |
| 2014/0108372 A1 | 4/2014 | Oh |
| 2014/0108547 A1 | 4/2014 | Rao |
| 2014/0136554 A1 | 5/2014 | Moradi |
| 2014/0137144 A1 | 5/2014 | Jarvenpaa |
| 2014/0150029 A1 | 5/2014 | Avedissian |
| 2014/0171039 A1 | 6/2014 | Bjontegard |
| 2014/0173644 A1 | 6/2014 | Ball |
| 2014/0173648 A1 | 6/2014 | Ball |
| 2014/0181120 A1 | 6/2014 | Sullivan |
| 2014/0181196 A1 | 6/2014 | Sullivan |
| 2014/0186004 A1 | 7/2014 | Hamer |
| 2014/0188681 A1 | 7/2014 | Shahghasemi |
| 2014/0188741 A1 | 7/2014 | Lustberg |
| 2014/0192199 A1 | 7/2014 | Tan et al. |
| 2014/0195675 A1 | 7/2014 | Silver |
| 2014/0200974 A1 | 7/2014 | Morin |
| 2014/0211090 A1 | 7/2014 | Faratzis |
| 2014/0214522 A1 | 7/2014 | Skollar |
| 2014/0237492 A1 | 8/2014 | Jones |
| 2014/0237497 A1 | 8/2014 | Jones |
| 2014/0253727 A1 | 9/2014 | Sadrieh |
| 2014/0267562 A1 | 9/2014 | Lemmey |
| 2014/0280540 A1 | 9/2014 | Wurtele |
| 2014/0282016 A1 | 9/2014 | Hosier, Jr. |
| 2014/0289337 A1 | 9/2014 | Green |
| 2014/0297652 A1 | 10/2014 | Stevens |
| 2014/0313341 A1 | 10/2014 | Stribling |
| 2014/0365580 A1 | 12/2014 | Azenkot |
| 2014/0372910 A1 | 12/2014 | Alford Mandzic |
| 2015/0058380 A1 | 2/2015 | Polonsky |
| 2015/0067102 A1 | 3/2015 | Tsarkova |
| 2015/0088622 A1 | 3/2015 | Ganschow |
| 2015/0134684 A1 | 5/2015 | Montana |
| 2015/0161565 A1 | 6/2015 | Kraft |
| 2015/0220526 A1 | 8/2015 | Green |
| 2015/0245097 A1 | 8/2015 | Agrawal |
| 2015/0312354 A1 | 10/2015 | Boyle |
| 2016/0006981 A1 | 1/2016 | Bauman |
| 2016/0007083 A1 | 1/2016 | Gurha |
| 2016/0155475 A1 | 6/2016 | Hamer |
| 2016/0173738 A1 | 6/2016 | Jones |
| 2016/0180883 A1 | 6/2016 | Hamer |
| 2016/0343037 A1 | 11/2016 | Nicholas |
| 2017/0039867 A1 | 2/2017 | Fieldman |

(56) References Cited

U.S. PATENT DOCUMENTS

| | | |
|---|---|---|
| 2017/0068361 A1 | 3/2017 | Imbruce |
| 2017/0093780 A1 | 3/2017 | Lieb |
| 2017/0099512 A1 | 4/2017 | Oshminer |
| 2017/0134783 A1 | 5/2017 | Boyle |
| 2017/0134831 A1 | 5/2017 | Talukder |
| 2017/0244655 A1 | 8/2017 | Moon |
| 2018/0034865 A1 | 2/2018 | Schoonmaker |
| 2018/0040017 A1 | 2/2018 | Chung |
| 2019/0149954 A1 | 5/2019 | Erickson |

OTHER PUBLICATIONS https://itunes.apple.com/us/app/chideo/id666170718?mt=8, "Chideo," Sep. 2013.

JockTalk Startup Looks to Boost Pro Athletes' Social Media Leverage, http://mashable.com/2012/04/18/jocktalk-startup/, (2012).

Jocktalk, http://web.archive.org/web/20121025092745/http://www.jocktalk.com, (Oct. 25, 2012).

PCT International Search Report and Written Opinion dated May 15, 2017, Application No. PCT/US2017/017182, 9 pp.

Extended European Search Report received in European Patent Application No. EP17756987, dated Sep. 15, 2019.

Office Action received in Australian Patent Application No. 2017223169, dated Dec. 18, 2020, four pages.

\* cited by examiner

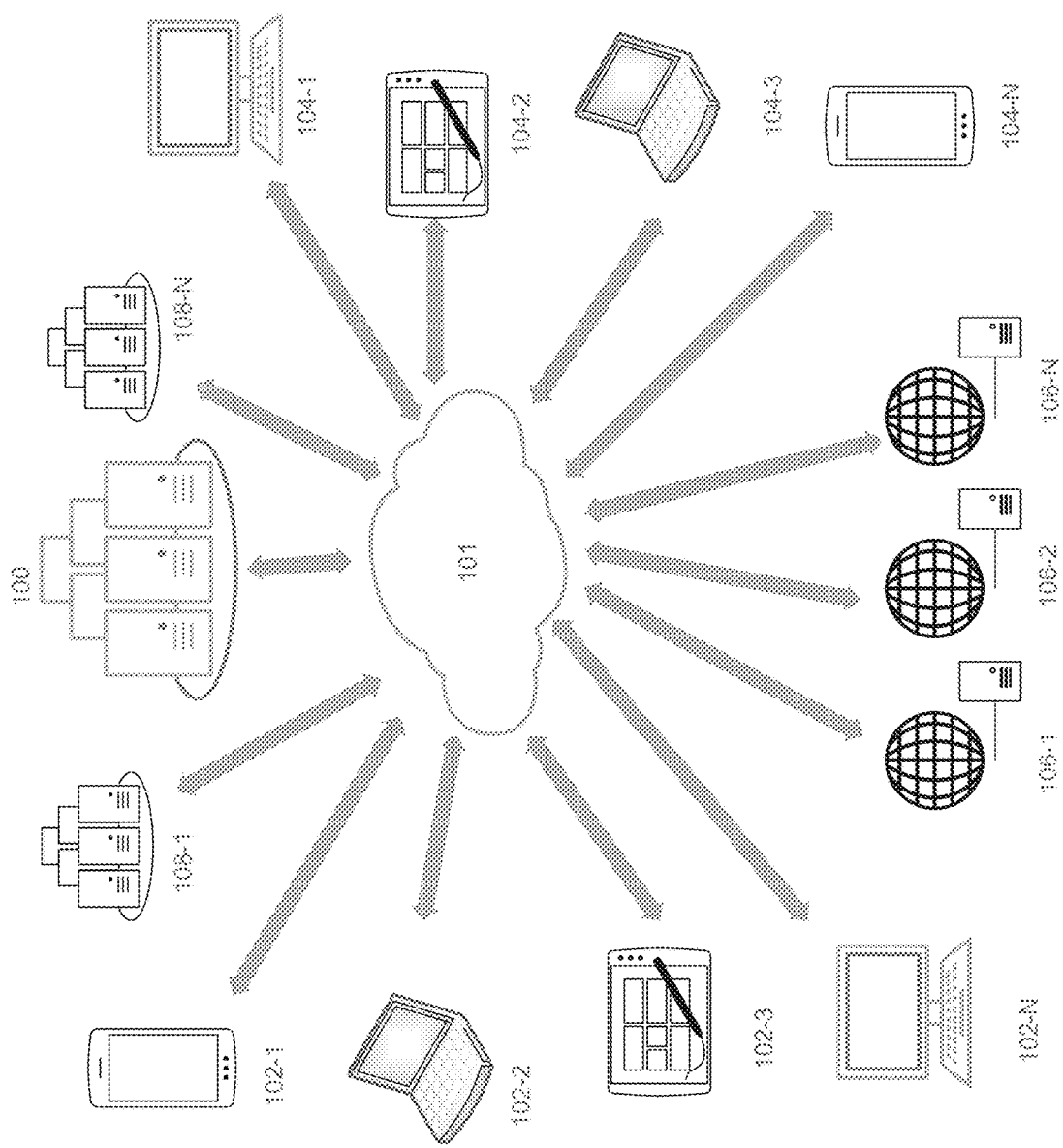

| CONTENT ID | CONTENT CONTRIBUTOR ID | CONTENT REQUESTER | TIMESTAMP | CONTENT TYPE (E.G., VIDEO, STILL IMAGE, GRAPHIC, TEXT) | CONTENT CATEGORY | APPROVAL STATUS | CAPTION | TITLE | NOTES | CONTENT LOCATOR | CONTENT QUALITY CATEGORY | CONTENT REQUEST TEXT | REPLY TO |
|---|---|---|---|---|---|---|---|---|---|---|---|---|---|
| | | | | | | | | | | | | | |

FIG. 2A1

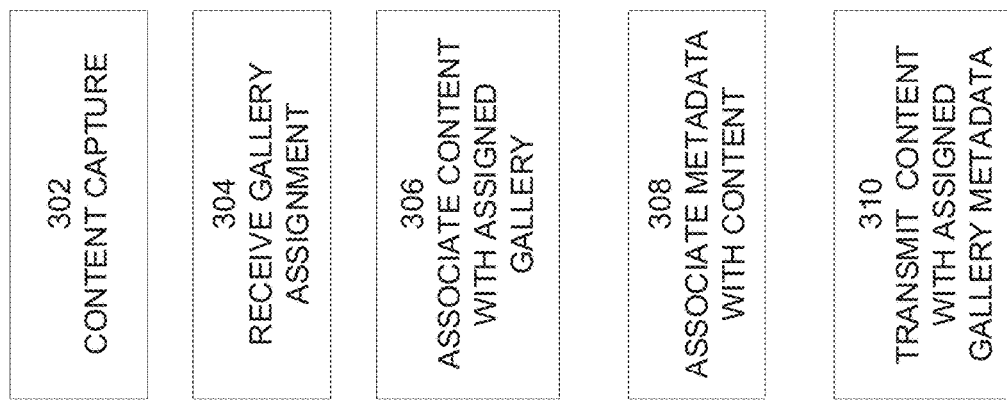

METHODS AND SYSTEMS FOR SECURE INFORMATION STORAGE AND DELIVERY

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

BACKGROUND OF THE INVENTION

Field of the Invention

The present invention is related to media collection, processing, and distribution.

Description of the Related Art

As the use of camera-equipped phones has proliferated, the sharing of photographs and videos have become an ever more important form of social engagement. However, conventional techniques for sharing photographs and videos fail to provide a secure, well-defined and recurring system for users to instantly distribute and share their photographs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to systems and processes that enable users to share information and content over a network. Such shared information and content may be instantly distributed over one or more distribution channels and platforms to one or more user devices. The content may also be securely stored in a repository. The user devices may host instantiations of a content sharing application. The content sharing application may be used to capture and/or upload content, such as still or video images, to the secure repository. The content sharing application may be used to receive (e.g., download) content, such as still or video images/photographs, from the secure repository and may render such content. The user devices may selectively store certain galleries received from the secure repository. Optionally, in response to the secure repository detecting that new gallery content has been received, a notification may be transmitted to devices of users with whom the gallery has been shared. Optionally, the notification may include a deep link to the gallery so users can immediately see what content has been added to the gallery. When the user selects the notification, the content sharing application may use the link to access the corresponding gallery on the remote secure repository, and then render the gallery content items, including the new content. Optionally, new content will be presented first in the displayed gallery (e.g., in timestamp order). Optionally, a visual indicator (e.g., a colored dot or other emphasis) may be rendered on user devices in association with content items that have been newly added since the last time the user has viewed the gallery. Optionally, instead or in addition, the secure repository content galleries may be selectively synchronized with the galleries stored on the user devices. Such synchronization may be performed in real time as new content is added to the secure repository content galleries.

An aspect of this disclosure relates to optionally and selectively performing content synchronization to reduce network and processor bandwidth usage.

An aspect of this disclosure relates to the optional performance of real time automatic synchronization of content and galleries across large numbers of systems and devices.

An aspect of this disclosure relates to secure encryption of sensitive data.

An aspect of this disclosure relates to user interfaces configured to make efficient use of display space in presenting data and configured to reduce or minimize accidental user selections.

An aspect of the present disclosure relates to a system for secure content storage and delivery, the secure content storage and delivery system comprising: a computer system comprising one or more computing devices; a network interface; and a computer storage system comprising a non-transitory storage device, said computer storage system having stored thereon executable program instructions that direct the computer system to at least: receive via the network interface, from a first device associated with a first entity, a first group definition; receive via the network interface, from a second device associated with a second entity, a second group definition; transmit via the network interface a first plurality of invitations to a respective first plurality of destinations, the first plurality of invitations comprising an invitation to associate with the first group; transmit via the network interface a second plurality of invitations to a respective second plurality of destinations, the second plurality of invitations comprising an invitation to associate with the second group; receive via the network interface one or more acceptances from users that received a first group invitation; encrypt one or more items of data associated with users that accepted the first group invitation, wherein at least a portion of the encrypted data associated with users that accepted the first group invitation is used to authenticate corresponding users that accepted the first group invitation in a subsequent interaction; associate users from whom first group invitation acceptances were received with the first group; receive via the network interface one or more acceptances from users that received a second group invitation; encrypt one or more items of data associated with users that accepted the second group invitation, wherein at least a portion of the encrypted data associated with users that accepted the second group invitation is used to authenticate corresponding users that accepted the second group invitation in a subsequent interaction; associate users from whom second group invitation acceptances were received with the second group; receive, via the network interface, from the first entity a first content gallery definition; receive, via the network interface, from the first entity an indication that the first content gallery is to be shared with the first group; cause the first content gallery to be instantiated on devices of users associated with the first group; receive, via the network interface, from the first entity a first content request for the first group; transmit, via the network interface, the first content request to users associated with the first group; receive, via the network interface, from a first user associated with the first group, a first item of content and associated metadata provided in response to the first content request; transcode the first item of content from a first size to a second size; cause the transcoded first item of content to be transmitted to users associated with the first group and to appear in instantiations of the first gallery on devices; receive, via the network interface, from the second entity a second content gallery definition; receive, via the network interface, from the second entity an indication that the second content gallery is to be shared with the second group; cause the second content gallery to be instantiated on devices of users associated with the second group; receive, via the network interface, from the second entity a second content request for the second group; transmit, via the network interface, the second content request to users associated with the second group; receive, via the network interface, from a second user associated with the second group, a second item of content and associated metadata provided in response to the second content request; transcode the second item of content from a second size to a second size; and automatically cause the transcoded second item of content to be transmitted to users associated with the second group and to appear in instantiations of the second gallery on devices.

An aspect of the present disclosure relates to a non-transitory storage media having stored thereon executable program instructions configured to direct a computer system to perform operations comprising: receive an invitation to join a first content sharing group; detect a user action corresponding to acceptance of the invitation to join the first content sharing group; at least partly in response to the detected user action corresponding to acceptance of the invitation to join the first content sharing group, cause an acceptance indication to be transmitted to a remote secure content storage and delivery system; in response to an instruction from the remote secure content storage and delivery system, cause a first content gallery to be instantiated on the computer system; enable a thumbnail of an image included in the first content gallery to be rendered as a representation of the first content gallery; enable a title of the first content gallery received from the remote secure content storage and delivery system to be rendered in association with the representation of the first content gallery; enable a number to be rendered in association with the representation of the first content gallery, the number corresponding to a quantity of content items included in the first content gallery; receive a new content item in association with an indication that the new content item is associated with the first content gallery; enable an updated number to be rendered in association with the representation of the first content gallery, the updated number reflecting the association of the new content item with the first content gallery; receive a user selection of the representation of the first content gallery; in response to the user selection of the representation of the first content gallery, cause content items, including the new content item, associated with the first content gallery to be rendered; receive a content request from the remote secure content storage and delivery system; cause the content request from the remote secure content storage and delivery system to be rendered; receive a user provided content item, wherein the user provided content item is provided in response to the displayed content request; and cause the user provided content item to be transmitted in association with an identification of the content request.

An aspect of the present disclosure relates to a computer implemented method comprising: receiving, over a wireless network at a first user device, an invitation to join a first content sharing group; detecting, using a content sharing application installed on the first user device, a user action corresponding to acceptance of the invitation to join the first content sharing group; at least partly in response to the detected user action corresponding to acceptance of the invitation to join the first content sharing group, causing, by the content sharing application, an acceptance indication to be transmitted to a remote system; in response to an instruction from the remote system, causing a first content gallery, using the content sharing application installed on the first user device, to be instantiated on the first user device; enabling, using the content sharing application installed on the first user device, a version of an image included in the first content gallery to be rendered as a representation of the first content gallery; enabling, using the content sharing application installed on the first user device, a title of the first content gallery received from the remote system to be rendered in association with the representation of the first content gallery; enabling, using the content sharing application installed on the first user device, a number to be rendered in association with the representation of the first content gallery, the number corresponding to a quantity of content items included in the first content gallery; receiving, using the content sharing application installed on the first user device, a new content item in association with an indication that the new content item is associated with the first content gallery; enabling, using the content sharing application installed on the first user device, an updated number to be rendered in association with the representation of the first content gallery, the updated number reflecting the association of the new content item with the first content gallery; receiving, using the content sharing application installed on the first user device, a user selection of the representation of the first content gallery; in response to the user selection of the representation of the first content gallery, causing content items, including the new content item, associated with the first content gallery to be rendered; receiving, using the content sharing application installed on the first user device, a content request from the remote system; causing, using the content sharing application installed on the first user device, the content request from the remote system to be rendered; receiving, using the content sharing application installed on the first user device, a user provided content item, wherein the user provided content item is provided in response to the displayed content request; and causing, using the content sharing application installed on the first user device, the user provided content item to be transmitted in association with an identification of the content request.

BRIEF DESCRIPTION OF THE DRAWINGS

Embodiments will now be described with reference to the drawings summarized below. These drawings and the associated description are provided to illustrate example embodiments, and not to limit the scope of the invention.

FIG. 1 illustrates an example networked environment.

FIG. 2A1 illustrates an example data schema.

FIGS. 3-5 illustrate example processes.

FIGS. 7A-7J illustrate additional example user interfaces.

DETAILED DESCRIPTION

Figure 2A:
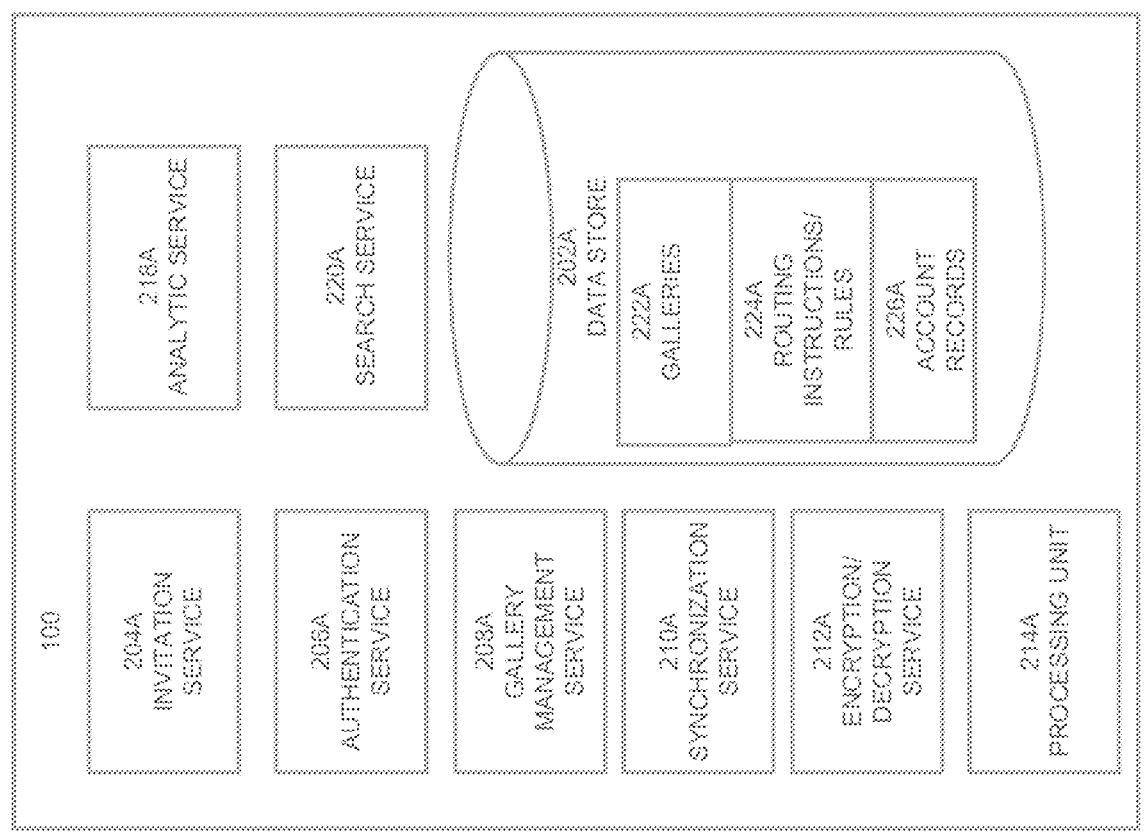
FIG. 2A illustrates an example content distribution and secure storage system architecture.

As similarly discussed above, as the use of camera-equipped phones and other mobile personal computing devices have proliferated, the sharing of photographs and videos have become an ever more important form of communication and social engagement. However, conventional techniques for sharing photographs and videos fail to provide a secure, well-defined and recurring process or system for users to instantly, securely distribute and share their photographs and videos in a transparent manner. Further, conventional techniques fail to adequately enable users to selectively share galleries of multiple items of content. Still further, conventional techniques fail to adequately provide easy-to-use content sharing interfaces. Yet further, conventional techniques fail to adequately enable the sharing of content across chained social networks.

Systems and methods are described herein that enable users to share information and content (e.g., audio, video, and/or text content), organize information and content, and search for information and content within one or more secure content repositories. Such shared information and content may be shared by users using content sharing applications hosted on user devices (e.g., mobile devices, such as smart cellular phones, tablet computers, laptop computers, wearables; desktop computers; smart televisions, game consoles, and/or other media storage devices; virtual desktops hosted on cloud-based system; and/or the like).

For example, a user may define a plurality of image galleries (which include still image/photograph files, gif files, video files, etc.) via a corresponding user interface. The gallery may optionally be maintained on a cloud-based system. The user may specify, on gallery-by-gallery basis, other users (e.g., defined sets of users or individual users) with whom a given gallery is to be shared.

Copies of some or all of the galleries may be selectively stored on a device of the user that controls the galleries, and/or on may be stored on the devices of those with whom the user is sharing the galleries (e.g., automatically or in response to a manual download command). Optionally, the content size/resolution of a given content item may be down sampled from the original size/resolution to a different size/resolution (e.g., a lower resolution), and a down sampled version may be provided to one or more devices as part of the sharing process. Optionally, a given content item may be transcoded from a first encoding to a second encoding (e.g., to make it more efficient to transmit or to be decoded). As noted above, user devices may include mobile computer devices (e.g., smart phones, tablet computers, laptop computers, wearable devices, and/or the like), desktop computers, smart televisions, game consoles, virtual desktops hosted on cloud-based system, and/or other media storage devices.

Certain example content sharing scenarios will now be described. A content requesting entity (e.g., a company or brand, or someone acting on their behalf) may, via a web application or a content sharing application hosted on a content requesting entity device, invite community members to contribute content (e.g., photographs, video, audio, and/or text content) regarding a specified subject matter. By way of illustration, if the content requesting entity is responsible for a product brand or service brand, the content requesting entity may request specified types of content (e.g., photographs, video, audio, and/or text content) regarding their experiences with the brand's products or services. The request may be provided via a textual message (optionally including images and/or sound content) transmitted to a user device. By way of further illustration, if the content requesting entity is associated with a sport team, the content requesting entity may request specified types of content regarding the team, a player on the team, or regarding a specific sporting event/game. By way of still further illustration, if the content requesting entity is associated with an entertainment entity or entertainment project (e.g., a movie, sound recording, a photograph, etc.), the content requesting entity may request specified types of content regarding the team or regarding the entertainment entity or entertainment project.

The content request may be received from the content requesting entity at a content distribution and secure storage system, which may then route the request to devices of the members of the community.

For example, the content request may be transmitted by the content distribution and secure storage system to and displayed via instantiations of a content sharing application hosted on respective member devices. A given member may generate and record the requested content (e.g., using a camera, microphone, and/or keyboard on the member device). The content may optionally be automatically associated with a gallery specified by the request. The content may be transmitted by the content sharing application to the content requesting entity (e.g., via the content distribution and secure storage system).

When the requested content is received from community members at the content distribution and secure storage system, the content distribution and secure storage system may transmit a notification indicating that the content was received to the application hosted on the content requesting entity's device. The application may in turn provide a visual and/or audio notification of the receipt of the requested. In addition or instead, the notification may be provided via a webpage, email, SMS message, or otherwise.

The requesting entity may then access, via a corresponding interface, the requested content. Optionally, the requested content is downloaded from the content distribution and secure storage system to the requesting entity device (e.g., in response to a manual user download instructions or automatically). Optionally, some or all of the downloaded content (e.g., image content) is downloaded at a lower-than-received-resolution to reduce the amount of network bandwidth needed to store the requested content on the requesting entity device and to reduce the memory on the requesting entity device needed to store the downloaded requested content. Optionally, when the requesting entity selects an item of downloaded content (e.g., by pointing at our touch content as displayed on the requesting entity device), a request for a higher resolution version (e.g., the resolution of the requested content as originally received by the content distribution and secure storage system) is automatically transmitted from the content distribution and secure storage system. The higher resolution version may then be downloaded and/or streamed to the requesting entity device.

The content requesting entity may review the low and/or high resolution versions of the content. The content requesting entity may provide real time feedback to the member that provided the content, specifying any desired content revisions through a messaging interface of the application on the requesting entity device. The feedback may be transmitted to the member device and displayed via the application hosted on the member device. In addition, the content requesting entity may organize content received from members (optionally in association with requester-created content) into content asset galleries (e.g., of videos, photographs, text, etc.). The content asset galleries may be organized by subject, content contributor, date, and/or otherwise. The content asset galleries may optionally be automatically updated in real time as new content is received using metadata associated with the new content.

The content requesting entity may approve the content via a corresponding approval user interface and share the content (e.g., specified asset galleries and/or specified individual items of content) directly with the community and/or via one or more content distribution channels. For example, the content requesting entity may specify, via a corresponding user interface, which gallery is to be shared with which individual community members or sets of community members. When the received content is added to a gallery, the update to gallery may be automatically synchronized to the selected community members/member sets, optionally in real time (e.g., so that when the community members/member sets access their devices they will be able to immediately view the new gallery content via the applications hosted on their devices). Optionally, when new content is added to a gallery, a notification may be automatically transmitted to devices of users with whom the gallery has been shared. Optionally, the notification may include a link to the updated gallery. When a user selects the notification via the user device (e.g., by tapping or clicking on the notification), a content sharing application hosted on the user device may use the link to access the corresponding gallery on the remote secure repository, and then present the gallery, including the new content. Optionally, the gallery content is not stored in non-volatile memory on the user device, and is instead only stored in volatile memory thereby reducing usage of the non-volatile memory. Optionally, rather than sharing entire content galleries, the content requesting entity may share individual items of content with selected members (e.g., on an item by item basis).

The distribution channels may include a variety of content sharing platforms, such as microblogs, social networking platforms, image sharing platforms, and/or the like. Optionally, prior to sharing the content, the content requesting entity may edit the received content, crop the content, color correct the content, rotate the content, extract portions of the content, add logos to the content, add graphic stamps to the content, add animations to the content, add notes, add metadata, and/or the like, save the modified content, and then distribute the content. For example, web-based or content sharing application editing controls may be provided via corresponding user interfaces that enable the foregoing edit-types to be performed, and the resulting edited content to be stored in memory.

In addition, the content requesting entity may also transmit requests to the community members (via the content sharing applications installed on respective community devices) to share the member-created content or content provided by the content requesting entity with the members' social network, via one or more specified or un-specified distribution channels (e.g., microblogs, social networking platforms, image sharing platforms, and/or the like). Thus, content may be shared quickly over chained social networks (wherein a given member may act as a link between the member's social network and the social network of a person in the member's social network) in a mesh matter, advantageously enabling content to be distributed to large number of users and user devices at high speed.

The content distribution and secure storage system may interface with and access a digital asset management (DAM) system of a given entity, and distribute content assets stored on the DAM.

Thus, community member-provided content and/or content provided by an entity (e.g., a sport, entertainment, and/or brand entity) may be distributed over networks in real time or near real time by the entity and/or community members associated with the entity. Such real time or near real time distribution may be used to provide community members (e.g., fans) with frequent, current perspectives on topics and entities of interest.

A search user interface may be provided enabling a user to search for desired content. The search may specify all or part of a gallery name, metadata (e.g., notes) associated with content, a time or time period associated with content creation, time or time period associated with content sharing, a community named, a content contributor name, and/or other search filter conditions. A search engine may receive the search query and filter conditions, identify matching galleries or content, and render the corresponding matching gallery thumbnails or content thumbnails in a search results list (which may be in a grid format) on the user device.

Optionally, the content distribution and secure storage system may generate analytics regarding the sharing of content so that the results of the content may be viewed and understood. The analytic data may include data received from the content sharing applications on user devices and from platforms via which content was shared or re-shared. For example, an application installed on a user device may transmit in real time an indication to the content distribution and secure storage system each time an item of content is viewed or shared via the application. The indication may include an identifier associated with the content item and an identifier associated with the platform/channel used to share the content item.

For example, the content distribution and secure storage system may track and report the number of content sharing requests made by an entity, the number of content items shared (e.g., by individuals and/or by a set of individuals), the date and time an item of content was shared, the platform via which an item of content was shared, the number of events associated with the shared content (e.g., views, clicks on, re-sharing, etc.), the shared content (or a link thereto), total social events, and/or other information. Filter controls may be provided wherein the user may instruct the system to filter the data presented to the entity user via the user interface. For example, a time filter, a shares filter, a media-type filter, and/or platform filters are provided that enable a user to specify for what time period, what type of shares, what type of shared media (e.g., videos, still images, text, etc.), and for what platforms (e.g., FACEBOOK, TWITTER, INSTAGRAM, SNAPCHAT, REDDIT, etc.) the data should be shown.

The analytic data may be updated and distributed in real time to one or more designated destinations/users each time an indication is received that a content item has been shared or acted on.

Certain aspects of the disclosure will now be discussed with reference to the figures.

Referring to FIG. 1, an example content distribution and secure storage system 100 may communicate over a network 101 with a plurality of user devices 102-1 . . . 102-N and with a plurality of user devices 104-1 . . . 104-N. The content distribution and secure storage system 100 may interact with the user devices via a client-server configuration. The content distribution and secure storage system 100 may comprise a hosted computing environment that includes a collection of physical computing resources that may be remotely accessible and may be rapidly provisioned as needed (sometimes referred to as a "cloud" computing environment). The content distribution and secure storage system 100 may also include a secure data store. The secure data store is optionally a hosted storage environment that includes a collection of physical data storage devices that may be remotely accessible and may be rapidly provisioned as needed (sometimes referred to as "cloud" storage).

The plurality of user devices 102-1 . . . 102-N and 104-1 . . . 104-N may include standalone computers (e.g., desktop, laptop, tablet, smart phone, smart television, wearable (e.g., a camera equipped watch, eyeglasses, item of clothing, etc.), or other computer device), a centralized computer system, or a cloud computing system. The user devices 102-1 . . . 102-N may be associated with users that provide content (e.g., still images, video images, audio content, text content, and/or the like) to a content requesting entity and/or to other content sharing platforms. User devices 104-1 . . . 104-N may be associated with users that access the content provided by the users of the user devices 102-1 . . . 102-N or by the entity. Of course, a given user and user device may be a provider of content and also a recipient of content.

One or more content sharing platforms 106-1, 106-2 . . . 106-N may communicate over the network 101 with the content distribution and secure storage system 100 and the plurality of user devices 102-1 . . . 102-N and 104-1 . . . 104-N. Content may be shared by the content distribution and secure storage system 100 and by user devices 102-1 . . . 102-N and 104-1 . . . 104-N to the content sharing platforms 106-1, 106-2 . . . 106-N. The content sharing platforms 106-1, 106-2 . . . 106-N may transmit posting or action data to the content distribution and secure storage system 100, which enables the content distribution and secure storage system 100 to generate and present analytic data as discussed elsewhere herein.

FIG. 2A illustrates an example architecture of the content distribution and secure storage system 100. The example content distribution and secure storage system 100 may include some or all of the following: an invitation service 204A, an authentication service 206A, a gallery management service 208A, a synchronization service 210A, an encryption/decryption service 212A, an analytic service 218A, a search service 220A, a processing unit 214A (which may include one or more computer processor devices), and a data store 202A.

The data store 202A may include one or more databases. A given database may be a relational database (e.g., an SQL database) or a non-relational database (a nonSQL database, such as NoSQL). For example, a relational database may advantageously use the same uniform language (e.g., DDL) for different user roles (developer, user, administrator, etc.), may use a standardized language for different relational database management systems, may use an advanced and non-structural querying language, and may comply with ACID principles (atomicity, consistency, isolation, durability), thus ensuring stability, security, and predictability both of the entire database and each transaction. A nonSQL database may be used rather than an SQL database as it better scales out horizontally across distributed systems and so can handle a large number of transactions (e.g., millions of transactions at a time). Further, a nonSQL database may be schema-free and so better utilized with unstructured and semi-structured data. Thus the selection of the database technology may be based on the particular use scenario (e.g., the need for stability and uniformity offered by SQL databases v. The need to process large amounts of unstructured and semi-structured data as provided by a nonSQL database).

The data store 202A may include a galleries data store 222A that may store content. The content may be logically ordered as galleries. A given item of content may be included in more than one gallery (e.g., by storing gallery pointers in the content metadata, or by storing content pointers in the gallery metadata). A given gallery may be associated with and controlled by an entity. For example, a company may have separate galleries for each entity brand. Each brand may have separate galleries for each product in a brand. By way of further example, a sports league may have different galleries for each team, and a team may have galleries for each player and for each game. A given gallery may be organized to include sub-galleries. Thus, there may be a hierarchy of galleries, enabling content to be quickly located and reducing the possibility of the wrong content being inadvertently shared. Content metadata may optionally be stored separately from the content itself. For example, the content may be stored on a cloud-based memory system, and the content metadata may be stored locally or on a different system with a pointer to the corresponding content stored on the cloud-based memory system.

For example, with reference to FIG. 1A1, metadata for a given content item may be stored in the data store 222A with the following metadata:

a content ID—a unique identifier of the content item (e.g., generated by the system 100 and assigned to the content item);

a content contributor ID—a unique identifier of the user who provided the content item (e.g., uploaded the content item to the system 100);

a content requester identifier (e.g., the entity/company that requested or owns the content item);

a timestamp (e.g., of when the content item was created and/or when the content item was uploaded);

a content item type (e.g. image, photograph, gif, video, graphic, text, and/or the like);

a content item category—an indication was to whether the content item was: uploaded in response to a specific content request; provided by the user but not in response to a specific request; provided via an entity DAM system;

approval status—an indication as to whether the content item has been reviewed and approved by an authorized entity for further distribution (e.g., company administrator, a contributor manager, etc.);

a caption—a user-provided description of caption context of the content (e.g., provided by the user when uploading the content item);

a title—a field used for internal management of content (e.g., auto-populated with source file name for bulk uploads or imports from another file system);

notes—a field used for internal management of content;

a content item reference—reference to source image and/or video file (e.g., a point, link, etc.)

a content quality category—indication as to the content quality category (e.g., low quality, medium quality, high quality transcoded versions of the content item)

content request text—request/prompt or reference to request/prompt to which the content item was uploaded as a response a replyTo content identifier—reference to a content identifier of another content item to which the current content item was uploaded or otherwise provided as a response The data store 202A may include a routing instructions/rules data store 224A that may store a given entity's instructions as to which galleries are to be shared with which users and/or sets/communities of users. The routing instructions may also specify which galleries are to be shared with which content sharing platforms (e.g., microblogs, social networking platforms, image sharing platforms, and/or the like). The routing instructions may also specify when a gallery (or a gallery update) is to be shared. For example, a routing instruction may specify that a gallery update is to be shared in real time with corresponding sets of users. By way of further example, a routing instruction may specify that a gallery update is to be shared at specific dates and/or times. The routing instructions may also specify in which geographical areas a gallery or gallery update is to be shared. For example, if the gallery relates to an event (e.g., a concert or a fair), optionally the gallery is shared with members that are present and/or live in the geographical area of the event (e.g., the same city, the same zip code, the same state, etc.). For example, a member's geographical area may be determined based on location information expressly provided by the member (e.g., during registration) and/or by location data (e.g., determined based on GPS radio data, cell phone data, WiFi data) provided by the member device.

The data store 202A may include an account data store 226A that may store a given entity's contact information, password, content sharing history, analytics, and/or other data. In addition, the account data store may store account records for users that have the content sharing application downloaded to and installed on their devices. For example, a user account record may store a user identifier, a user password, and or a unique identifier associated with the instantiation of the content sharing application stored on the user device. The user account record may store a user email address, mobile phone number (SMS address), physical address, and/or other user data.

To enhance security and reduce the possibility of successful hacking and improper access to user data, the password may be stored in memory using a uni-directional hash (e.g., SHA512) using a combined system and unique user salt. When a user attempts to login (e.g., using a UserID/email address and password) to access the user's account or service, the system 100 may perform the account lookup for authentication by hashing the password supplied during login and comparing the hashed password against the stored value.

Other user information, such as user contact information (e.g., email address, SMS/mobile phone address, etc.) may be encrypted with a combined system and unique user salt, with the result hash data stored. Such contact information may be accessed and decrypted when sending notifications to the user.

The invitation service 204A may be configured to send out an invitation (as instructed by an entity) to one or more users to join a designated community. The invitation may be sent to the content sharing application installed on the users' devices, via email, via text message, or otherwise. If a user accepts the invitation (e.g., by activating an invitation acceptance control presented via the content sharing application, by selecting an invitation acceptance link in the invitation, by entering a code (e.g., an alphanumeric code included in the invitation into a corresponding user interface field, or otherwise), the acceptance is received by the invitation service 204A, and a record is stored indicating that the accepting user is to be assigned to the designated community. Of course, a user may be a member of more than community of more than one entity. Thus, a given user may receive multiple invitations from different entities.

The authentication service 206A authenticates users accessing the system 100 (e.g., an entity that issues content requests, users that upload/stream content to the system 100, users that download/access content stored on the system).

The optional synchronization service 210A may optionally be configured to handle various exception conditions. For example, the synchronization service 210A may be configured to detect when a user device is offline, and in response to detecting that the user device is offline, may attempt to perform content synchronization with the user device at specified intervals or time periods. By way of further example, the synchronization service 210A may be configured to detect when a synchronization process with a user device is interrupted and which content items were synchronized with the user device prior to the synchronization interruption, and in response to detecting that the synchronization interruption, attempt to complete the content synchronization (e.g., with only the not-yet synchronized content) with the user device at specified intervals or time periods. By optionally keeping track of the what content has and has not yet been synchronized with a given user device, the synchronization service 210A avoids wasteful utilization of network bandwidth and processor resources by avoiding re-synchronizing already synchronized content. Optionally, instead of or in addition to the foregoing error handling processes, if the application on the user device detects that its communication has been interrupted (e.g., because there is no network available and/or if all available network bandwidth has been consumed), the application may render an error message indicating the content is not available because of a communication failure, and instructing the user to refresh the application content viewer when the user device has a network (e.g., Internet) connection. If gallery content has not been downloaded to the user device and there is no network access, the user device will not display gallery content.

The analytic service 218 may analyze various types of data and generate data providing insights into the type of content that is popular, shared, viewed, acted on, as well as insight as to which users or sets of users are popular, sharers, viewers, etc. The following types of example information may be tracked and reported.

- The number and types of content requests (e.g., requests for photographs, videos, audio, and/or text content) made to a defined community/group of users.
- the number and types of content requests made to a given individual user.
- the number and types of content items (e.g., photographs, videos, audio, and/or text content items) provided by a defined community/group of users.
- the number and types of content items provided by a given individual user.
- the number and types of content items shared by a defined community/group of users and the content sharing platforms (e.g., microblogs, social networking platforms, image sharing platforms, and/or the like) used to share respective content items.
- the number and types of content items shared by a given user and the content sharing platforms (e.g., microblogs, social networking platforms, image sharing platforms, and/or the like) used to share respective content items.
- the number and types of interactions (e.g., views, clicks, re-sharing, likes, dislikes, favorite indications, comments, detail expand commands, and/or the like) of a given content item and the via which the interactions were received.
- the demographics (age, gender, education level, income, and/or the like) of those who interacted with a content item (e.g., optionally as determined from account records and/or social graphs accessed from content sharing platforms; optionally instead, no social graph data is accessed from third party systems).
- the interests (e.g., in sports teams, players, actors, movies, plays, amusement parks, and/or the like) of those who interacted with a content item (e.g., as determined from account records or social graphs accessed from content sharing platforms).

an identification of which types of viewers (e.g., based on interests and/or demographics) most often interact with a given type or source of content.

an indication as to whether viewers interacted with a given item of content via a dedicated application (e.g., a mobile device app) associated with the content sharing platform or via a web browser.

the number of comments mentioning an item of content via a platform.

an identification of which posting of a content item received the most interactions of a given type and/or an identification of the user that made the posting.

an identification as to the number of followers or friends a given content item poster has.

the ratio of content views divided by other content interactions.

Figure 2B:
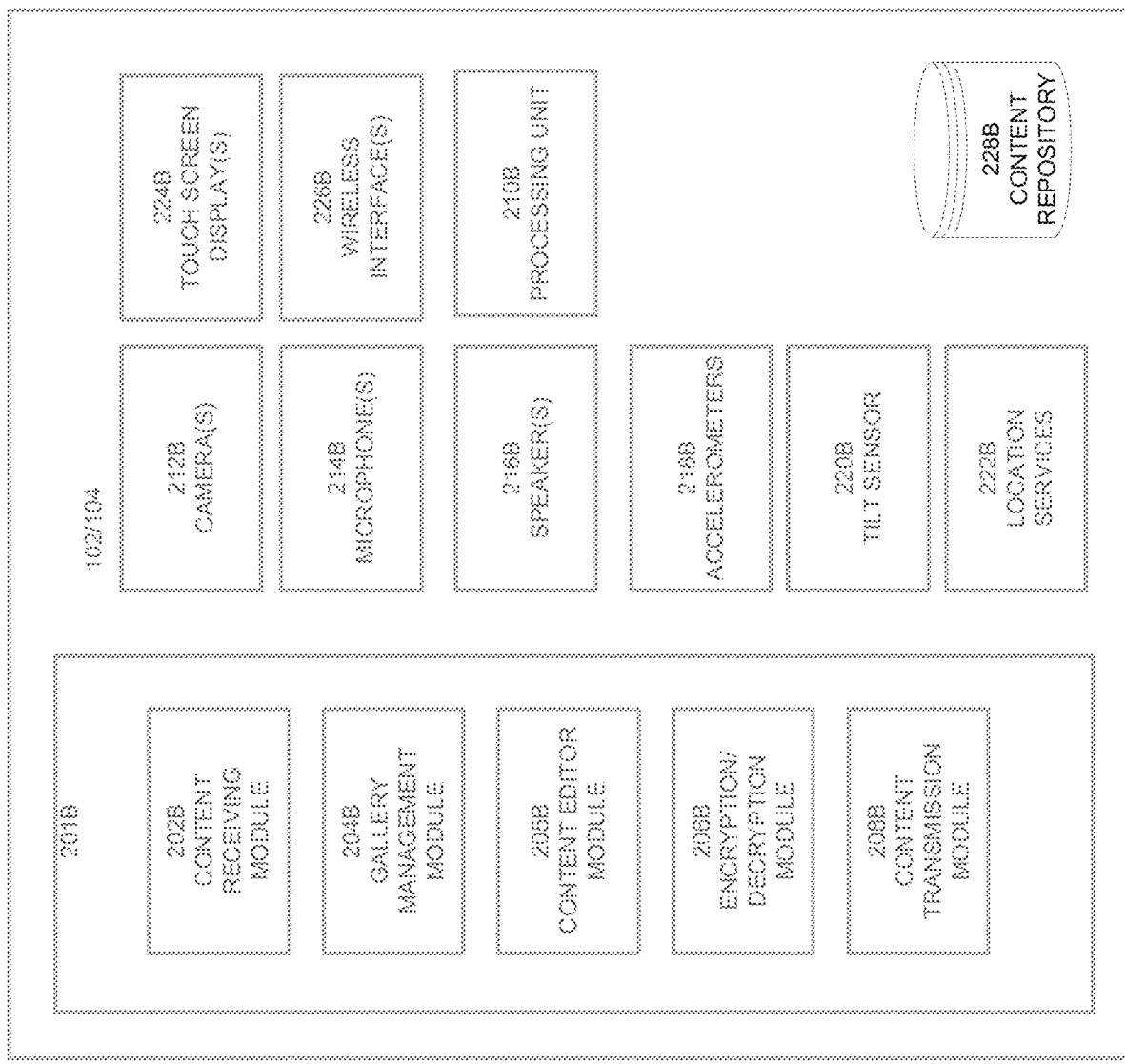
FIG. 2B illustrates an example user system architecture.

FIG. 2B illustrates an example user device architecture (which may correspond to user device 102 and/or user device 104). The user device may include a variety of sensors (e.g., sound, image (e.g., cameras), orientation, pressure, light, acceleration, and/or other sensors) configured to detect user input and interaction with the user device, as well as the local environment. For example, the user device may include a touch screen 224B configured to display user interfaces and data and configured to receive user input via touch. The user device may include a physical keyboard. The user device may include a mouse or other pointing device. The user device may include one or more microphones 220B to receive and record voice data and/or to receive commands, and one or more speakers 216B to play audible content. Thus, for example, the user inputs described herein may be received via touch, a mouse click, a voice command, or otherwise. The user device may include one or more cameras 212B configured to capture, record, and/or stream video (and/or still image) data (which may be stored or streamed in association with captured audio data) to other systems, such as the system 100. For example, a camera 212B may be a front or rear facing camera of a phone or other mobile device, a PC/laptop webcam, or other image capture device. A given user device may include or be configured with media players that enable the user device to play video and/or audio content, and display still images.

The user device may include one or more accelerometers/gryometers 218B that measures acceleration in 2 or 3 directions, and/or that measures orientation in 2 or 3 axes. The user device may include a tilt sensor 220B that detects user device tilt. The user device may include location services 222B that detects and report the current location of the user device. For example, the location services 222B may include and/or utilize a global navigation satellite system (GNSS) radio (e.g., a GPS, GLONASS, BeiDou, and/or Galileo GNSS) radios, a cell tower triangulation system, the WiFi location service system, or other system configured to determine and report the device location.

The user device may include one or more wireless communication interfaces 226B. For example, the user device may include a cellular radio, a WiFi modem, a Bluetooth modem, a NFC interface, and/or other wireless interface. The user device may include one or more processing devices 210B which may include code (e.g., module code) to perform the various operations described herein.

The user device may include a content repository 228B which may include content received or shared via a content sharing application 201B.

The content sharing application 201B may include some of all of the following modules: a content receiving module 202B, a gallery management module 204B, a content editor module, 205B, an encryption/decryption module 206B, a content transmission module 208B, and a content editing module 209B. The content receiving module 202B may be configured to receive content from the content distribution and secure storage system 100. The content receiving module 202B may generate a visual and/or audible notification in response to detecting the receipt of content. The visual notification may be presented on a home screen of the user device operating system, on the user device lock screen, and/or by a user interface of the content sharing application 201B (e.g., when the content sharing application 201B is open and being viewed). The gallery management module 204B is configured to cause the received content to be displayed in the appropriate content gallery. The content editor module 205B provides a user interface including content editing controls that enables the user to crop the content, color correct the content, rotate the content, extract portions of the content, add logos to the content, add graphic stamps to the content, add animations to the content, add notes, add metadata, and/or the like. The encryption/decryption module 206B may be used to encrypt and/or decrypt content items received by the content receiving module 202B, transmitted by the application 201B, and/or stored in the content repository 228B.

FIG. 3 illustrates an example process of capturing, storing, and sharing content items (e.g., wherein the content items may include one or more of the following content types: still images/photographs, gif files, videos (optionally with audio tracks), audio files, etc.). The process may be executed in whole or in part by a user device (e.g., using a content sharing application executing thereon). At block 302, content is captured. For example, content may be captured via one or more user device sensors (e.g., a camera, a microphone, etc.). At block 304, using a content sharing application hosted on the user device, the user may view the content and add the content to one or more existing content galleries and/or newly created content galleries (which may have associated titles and organizing themes, such as event type, people in the content, location of content capture, etc.). The user may also enter, via user interface fields, various data related to the content, such as a caption, comments, and/or the like.

At block 306, the gallery assignment may be stored in association with the content. At block 308, other metadata may be stored in association with the content. For example, the metadata may include related data provided by the user (e.g., caption, comments, etc.), an identifier of the galleries to which the content has been assigned, a content identifier generated by the content sharing application, an identifier associated with the user, an identifier associated with a requester of the content item, a creation timestamp, a content type indicator, a content category indicator, content resolution data (e.g., in pixels), request text from a request for the content, a content identifier of another content item to which the current content item was uploaded or otherwise provided as a response, and/or other metadata. At bock 310, the content sharing application initiates a transmission of the content and/or associated metadata to a destination. For example, the content and metadata may be transmitted to the content distribution and secure storage system discussed elsewhere herein and/or to a separate cloud storage system.

The transmission may be performed in real time in response to detecting the new content, as part of a periodic synchronization process, in response to a request by the content distribution and secure storage system, in response to a manual user command (e.g., activation of an upload control), and/or in response to other events.

Optionally, if the size of a content item to be uploaded is determined by the content sharing application to be greater than a specified threshold, the content sharing application hosted on the user device will automatically down sample the content item to generate a smaller file, and the down sampled content item may be uploaded to thereby reduce network utilization for uploading the content item, and to reduce memory storage needed for the content item. Optionally, if the user device detects that there is no network access available, the content sharing application may queue (e.g., in memory) one or more items of content that are designated for uploading. Once the user device detects that there is network access available, the content sharing application may cause the queued content to be uploaded.

Figure 4:

FIG. 4 illustrates an example process of receiving content from user devices and synchronizing the received content with user devices. The process may be executed in whole or in part by the content distribution and secure storage system. At block 402, content and content metadata is received from a given user device. For example, the content and content metadata may be received using a content sharing application hosted on the user device as similarly described above with respect to FIG. 3. The content and content metadata may be pulled from the user device (e.g., the content distribution and secure storage system may request content as part of a synchronization process), or the content and content metadata may be pushed by the user device (where the user device may initiate the content and content metadata transmission in response to one or more events as described above with reference to FIG. 3).

At block 403, metadata and/or content may optionally be encrypted. For example, personally identifying information (e.g., a content contributor's name, email address, phone number, geolocation data, and/or other personal information that may be stored) may be encrypted while optionally other metadata (e.g., the content identifier) may not be encrypted. Optionally, all metadata or no metadata is encrypted. Similarly, content may be optionally be selectively encrypted. For example, content that includes a face (e.g., as determined using a face detection engine, such as an engine that implements Eigen-face techniques or a genetic algorithm) may be encrypted while other content may not be encrypted. Optionally, all content or no content is encrypted. By way of example, metadata image content and other content may be encrypted using a symmetric encryption algorithm, such as Advanced Encryption Standard (e.g., AES-128, AES-192, AES-256.). Optionally, a block cypher may be used for encryption (e.g., utilizing multiple keys). Optionally, RSA may be used for encryption.

At block 404, the process accesses and/or generates additional metadata. For example, the additional metadata may include metadata described herein with respect to the example data schema illustrated in FIG. 2A1, such as a unique ID, a received timestamp, a quality category indicator, and/or other metadata described herein. By way of further example, some of the metadata may be received from a system user (e.g., an administrator) via respective user interface fields, such as approval indicators, notes, title, and/or other system user provided data.

At block 406, the received content, the received content metadata, and the system generated content metadata are stored in memory (e.g., in encrypted or non-encrypted form as appropriate). Optionally, a link to the content may be stored on one system (optionally with content metadata), and the content itself (optionally with content metadata) may be stored on a another (e.g., remote) system.

At block 408, routing and synchronization rules may be accessed from an instructions/rules store. For example, as described elsewhere herein routing instructions/rules store may store instructions/rules as to which galleries are to be shared with which users and/or sets of users, and whether the sharing to be performed on a push basis or on a pull (on-demand) basis. The routing instructions may also specify which galleries are to be shared via which content sharing platforms (e.g., microblogs, social networking platforms, image sharing platforms, and/or the like). The routing instructions may additionally specify when a gallery (or a gallery update) is to be shared and synchronized with user devices. For example, a routing instruction may specify that a gallery update is to be shared in real time with corresponding sets of users. By way of further example, a routing instruction may specify that a gallery update is to be shared at specific dates and/or times. A routing instruction may specify that a gallery update is to be shared on an on-demand basis (e.g., in response to a user opening a content sharing application or activating a refresh control which causes a content update request to be transmitted to the system). The routing instructions may also specify in which geographical areas (e.g., zip code, area code, city, state, GPS coordinates, venue, etc.) a gallery or gallery update is to be shared. For example, if the gallery relates to an event (e.g., a concert or a fair), optionally the gallery is shared with members that are present and/or live in the geographical area of the event (e.g., the same city, the same zip code, the same state, etc.).

If the routing and synchronization rules indicate that the content is to be shared on a push basis, then at block 410, the process determines which user devices/applications are online and available to receive the content. For example, the process may determine if a user device is online by pinging the user device or by determining if a heartbeat signal is being received. If the content is being shared on a pull basis, the process may limit sharing to those devices (e.g., via respective content sharing applications) have requested content updates.

At block 412, the received content and selected portions of the metadata may be downloaded to and synchronized (e.g., over a wireless network) with content repositories on the user devices identified at block 410. Optionally, when the process detects that new content is added to a gallery, a notification may be transmitted over a network to devices of users with whom the gallery has been shared. The notification may include a link to the gallery. When a user selects the notification, a content sharing application hosted on the user device may use the link to access the corresponding gallery on the remote secure repository, and then present the gallery, including the new content.

Optionally, the content may have been down sampled to lower than original resolution (e.g., to thumbnail resolution) before being downloaded to the user device. Optionally, multiple versions of a given content item may be generated via transcoding (from one encoding to a different encoding) and down sampling, and then downloaded to the user device. For example, a high resolution version and thumbnail version may be generated and downloaded to the user device.

The content metadata may be filtered prior to transmission to the user device based on one or more metadata sharing rules. For example, the metadata sharing rules may filter out the content contributor ID, the content requester, the timestamp, the content item type, the content item category, the approval status, the user provided caption, the title, notes, content quality category, content request text, and/or other metadata discussed herein. Such filtering may inhibit the transmission of certain content, thereby reducing network utilization.

For example, if another user adds a photograph to a content gallery (e.g., a gallery hosted on a cloud based storage system), optionally the content distribution and secure storage system may automatically synchronize the gallery update (in accordance with any filter conditions) or provide the entire gallery in response to a notification link activation in real time to user devices that have access to the gallery so that the new content and updates to the gallery data (e.g., the number of content items in the gallery) is provided to the users.

Figure 5:
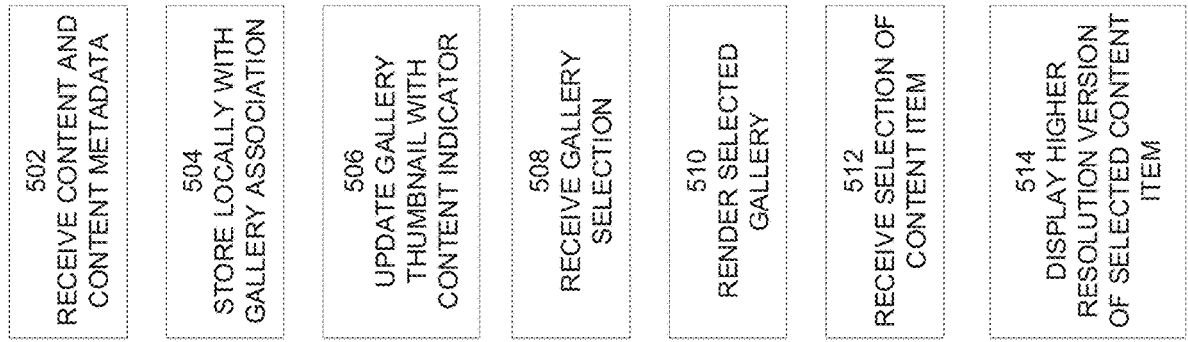

FIG. 5 illustrates an example process of receiving content items (e.g., from the process described above with respect to FIG. 4) over a network. The process may be executed in whole or in part by a user device (e.g., using a content sharing application executing thereon). At block 502, the user device receives content and associated content metadata (e.g., from a content distribution and secure storage system). For example, the content may be pushed by the content distribution and secure storage system as part of a synchronization process, or the content may have been requested by the user device in response to a user opening a content sharing application or activating a refresh control which causes a content update request to be transmitted to the content distribution and secure storage system. By way of further example, the content may be requested by the user device in response to the user activating notification indicating that there is new gallery content available. The content metadata may include metadata indicating what gallery or galleries the content is associated with, and may include a timestamp. Optionally, the content may be received at relatively low resolution (e.g., thumbnail size, such as 75×75 pixels, 200×200 pixels, etc.). Optionally, the content may be received in multiple versions (e.g., at relatively low resolution and at relatively high resolution).

At block 504, the content and some or all of the content metadata is stored in local user device memory (e.g., a content repository). At block 506, If the content sharing application has a galleries user interface displayed, the galleries user interface may display thumbnails of representative images of respective galleries, with a given thumbnail annotated to show how many content items are associated with the gallery. The annotations (examples of which are described elsewhere herein) associated with the galleries may be updated in real time to indicate how many content items are now associated with the respective galleries as a result of the received content. Optionally, a new content indicator may be presented in association with a gallery thumbnail to indicate that the gallery contains content that the user has not yet viewed.

At block 508, a user selection of a gallery may be received (e.g., by the user touching or clicking on a corresponding gallery thumbnail). At block 510, the selected gallery may be "opened" and the associated content items (e.g., images) displayed via a scrollable user interface. The content items may be rendered at relatively low resolution (e.g., as thumbnails). Optionally, new content items may be visually flagged (e.g., using an icon, frame, or other emphasis) by the content sharing application when rendered. For example, optionally each time the content sharing application is opened, or a gallery therein, an access timestamp is recorded. Each time the sharing application is opened, or a gallery therein, the previous access timestamp may be compared against each gallery content item timestamp. Each content item timestamp that is later than the previous access timestamp may be visually flagged by the content sharing application as a new content item so the user may quickly identify the new content.

At block 512, a user selection of a content item is received. At block 514, the selected content item is rendered at higher resolution (e.g., full screen). The higher resolution version of the content item may be accessed from local memory or it may be accessed from the content distribution and secure storage system.

Certain example user interfaces will now be described with reference to the figures. The user interfaces may optionally be specifically configured to be served by a web server for display via a web browser hosted on a user device, or the user interfaces may be presented via a dedicated application (e.g., the content sharing application discussed herein) hosted on a user device. The user interfaces may optionally be specifically be configured to be displayed and utilized via a relatively small touch-enabled display (e.g., a smart phone or tablet touch display), or to be displayed and utilized via a relatively large display (e.g., a laptop, desktop, or television display, which may or may not be touch-enabled).

Figure 6A:
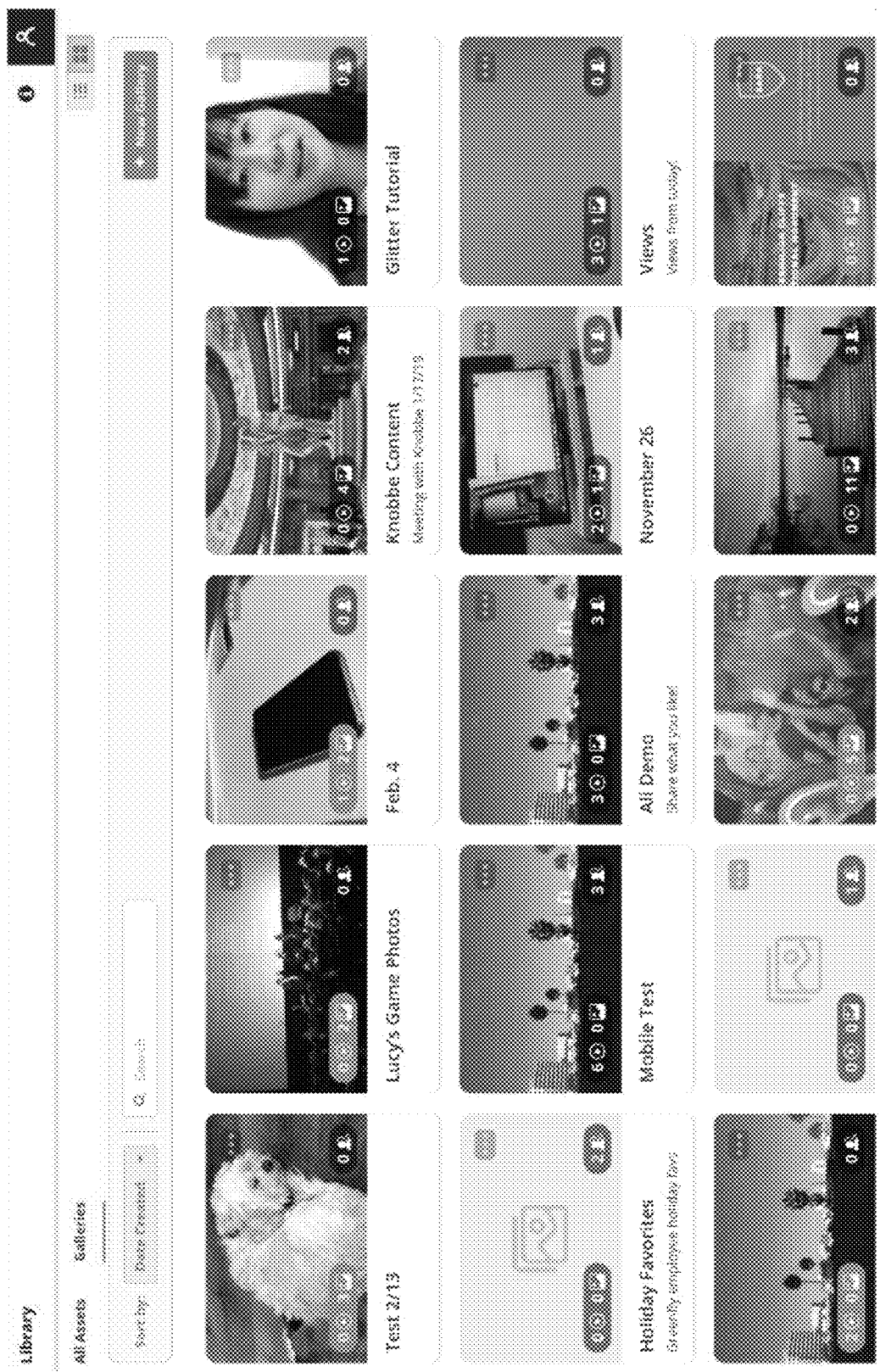
FIGS. 6A-6D illustrate example user interfaces.

FIG. 6A illustrates an example galleries user interface, which may be rendered via a relatively large screen device (e.g., a laptop, desktop, network television, and/or the like). The user interface may be rendered by a content sharing application hosted on a user device or may be accessed as a webpage from a web server. The galleries user interface may display thumbnails of representative images from the respective galleries in a grid view. A given gallery thumbnail may be annotated with text and graphics indicating the gallery title, the number of videos contained in the gallery, the number of still images contained in the gallery, the number of users that submitted content in the gallery, and/or the number of users with whom the gallery is being shared. Some or all of the annotations may be rendered as overlays on the respective gallery thumbnails. Thus, a great deal of information is displayed in a compact area, while still being easily readable, and without risking a user mis-associating a given item of information with a given gallery.

Still referring to FIG. 6A, A sort control is provided via which the user may request a different arrangement/sort of the galleries (e.g., by date created, alphabetically, largest to smallest (e.g., where the size is based on the number of content items in the gallery), smallest to largest, most user contributors to least user contributors, least user contributors to most user contributors, largest user set to smallest user set being shared with, smallest user set to largest user set being shared with, etc.). A search field is provided via which the user can enter one or more text search terms. The search query may be transmitted to a search engine which will compare the search terms to metadata associated with galleries and/or gallery content, identify matches, and provide search results (e.g., including names and/or images of matching galleries and/or content).

Figure 6B:
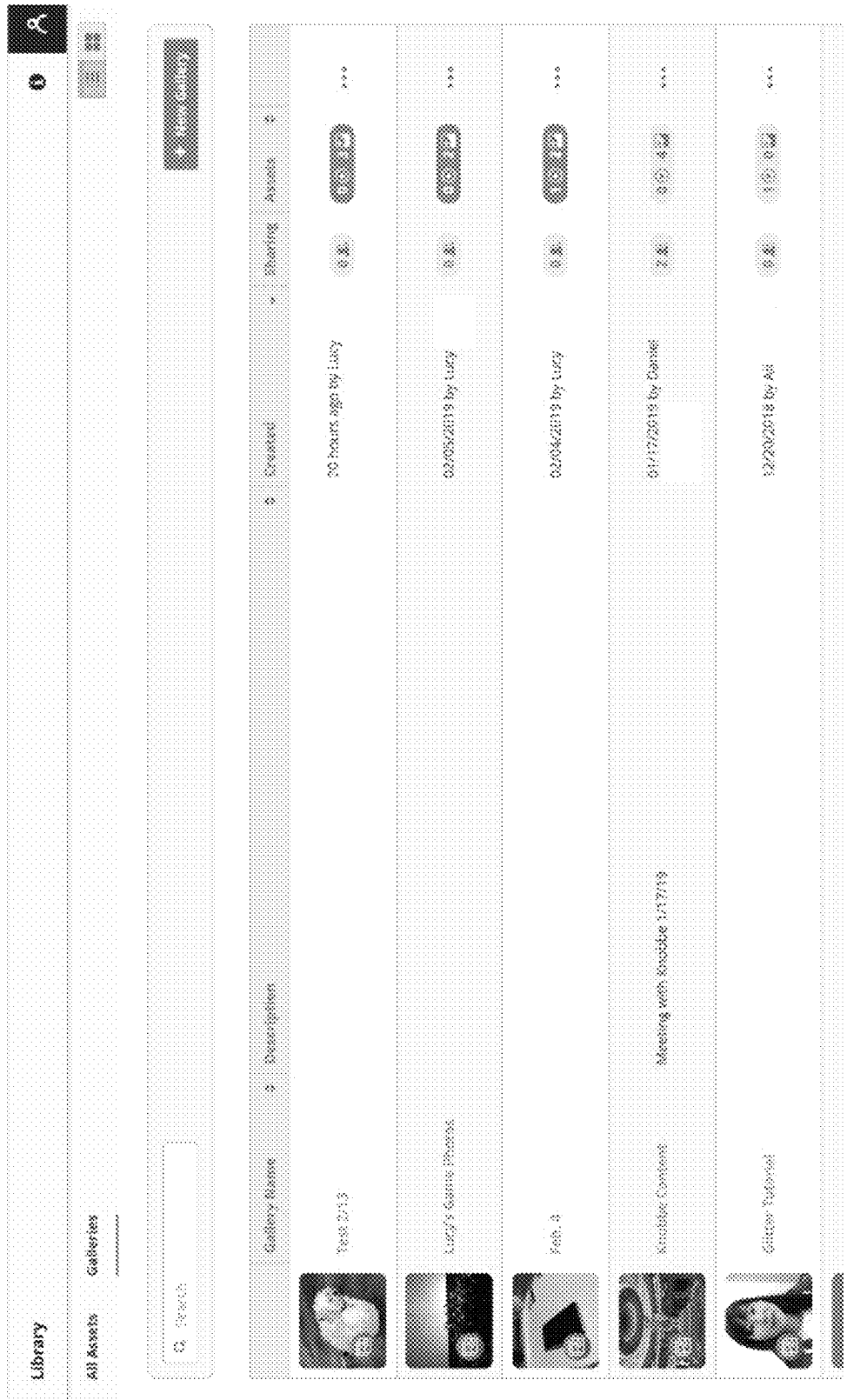

FIG. 6B illustrates an example galleries user interface, similar to that in FIG. 6A, with the galleries displayed in list form. Some or all of the annotations described above with respect to FIG. 6B may be displayed in separate columns. For example, a gallery name may be displayed in a gallery name column. A gallery description may be displayed in a description column. A created column may indicate the day/time the gallery was created and the name/identifier of the user that created the gallery. The number of users a given gallery is being shared with is displayed in a sharing column. The number of content items in a given gallery may be displayed in an assets column.

Figure 6C:
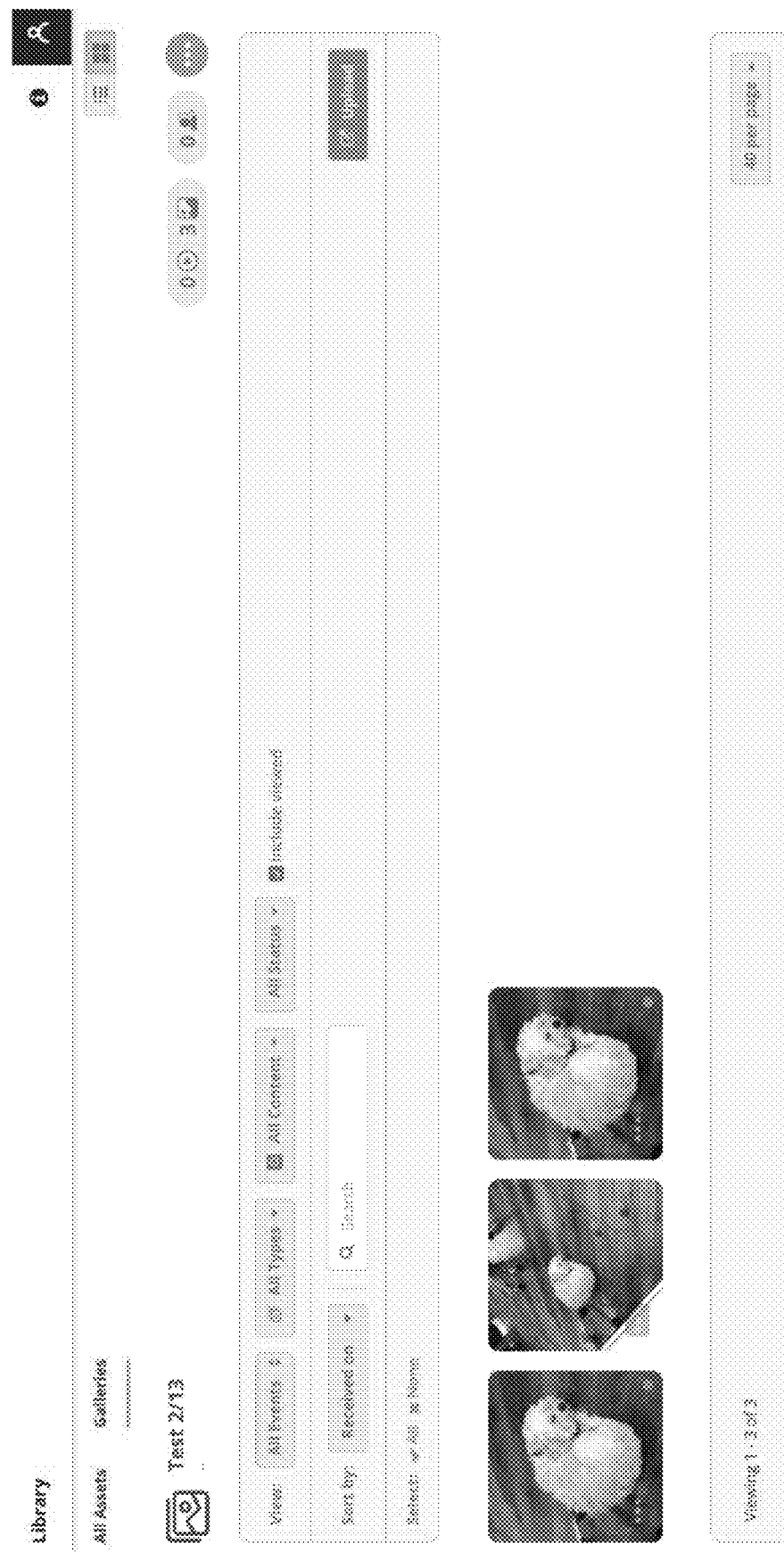

FIG. 6C illustrates an example gallery details user interface, which may be displayed in response to a user selecting a gallery via the user interfaces illustrated in FIG. 6A or FIG. 6B. The user interface may display content included in the gallery. Filter controls may be provided enabling the user to specify filter conditions. For example, drop down menus may be provided listing events, content types, and approval status. A control may be provided enabling the user to specify whether previously viewed content items should or should not be included. In response to the filter conditions, the user interface may filter the displayed content items to those items that match the user-specified filter conditions. A sort control is provided via which the user can specify the sort order of the content items (e.g., by date received, by date shared, alphabetically, etc.). The top right of the user interface may display the number of each type of content item and the number of users the gallery is being shared with.

Figure 6D:
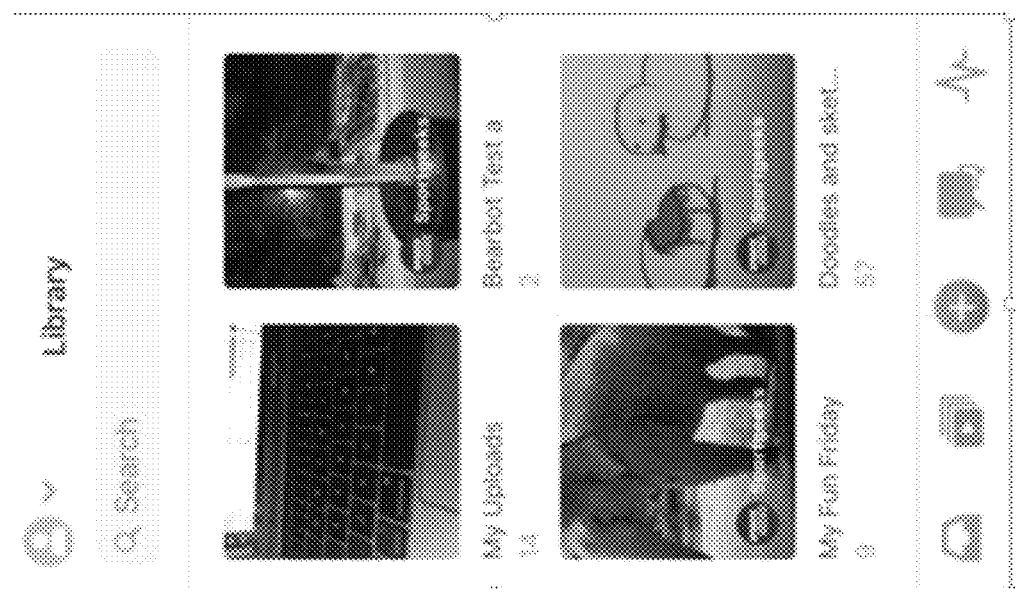

FIG. 6D illustrates an example galleries user interface configured to be rendered on a relatively small touch-enabled display (e.g., of a mobile phone or tablet computer). The user interface may display gallery thumbnails with a reduced set of annotations relative to the user interface illustrated in FIG. 6A. For example, optionally the annotations may indicate the total number of content items in a gallery without distinguishing between still and video content items. In addition, to enhance privacy, the annotations may not include the gallery creator name. A search field is provided, as similarly discussed above, which may be used to receive a search query. For example, the search query may be provided to a search engine which may locate corresponding content item galleries, content items, and/or content item contributors. The search results be provided by the search engine and rendered on the user device. Optionally and advantageously, the user interface and the displayed data/content may be automatically updated as new content is added to one of the displayed galleries by other users. For example, if another user adds a photograph to one of the galleries hosted on a cloud-based storage system, the content distribution and secure storage system may detect the addition and automatically synchronize the update in real time with user devices that have permitted access to the galleries.

Figure 7A:

As discussed elsewhere herein, an invitation may be sent to a user to join a designated community. The invitation may be sent to the content sharing application installed on the users' devices, via email, via text message, or otherwise. The invitation may include a unique invitation code. The user interface illustrated in FIG. 7A (which may be presented by a content sharing application on the user device) includes a field configured to receive the invitation code. If the user enters the code into the field, the code may be transmitted to the content distribution and secure storage system, which may assign the user to the corresponding content sharing community and store such assignment in a user account record.

Figure 7B:
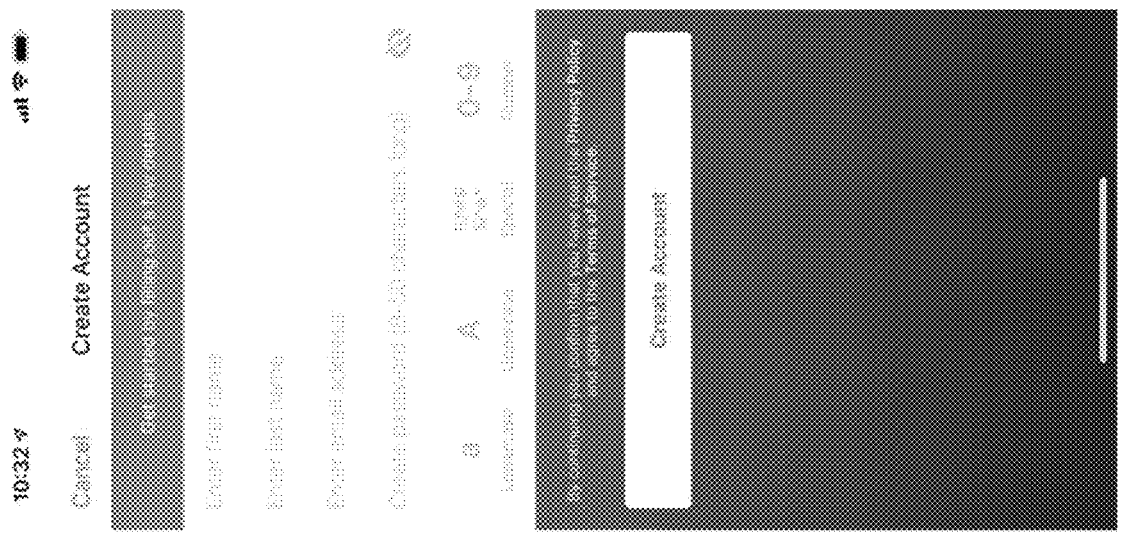

The user interface illustrated in FIG. 7B has fields configured to receive user data (e.g., name, password, email address, SMS address/phone number, etc.) used to set up a user account and associated account record.

Figure 7C:
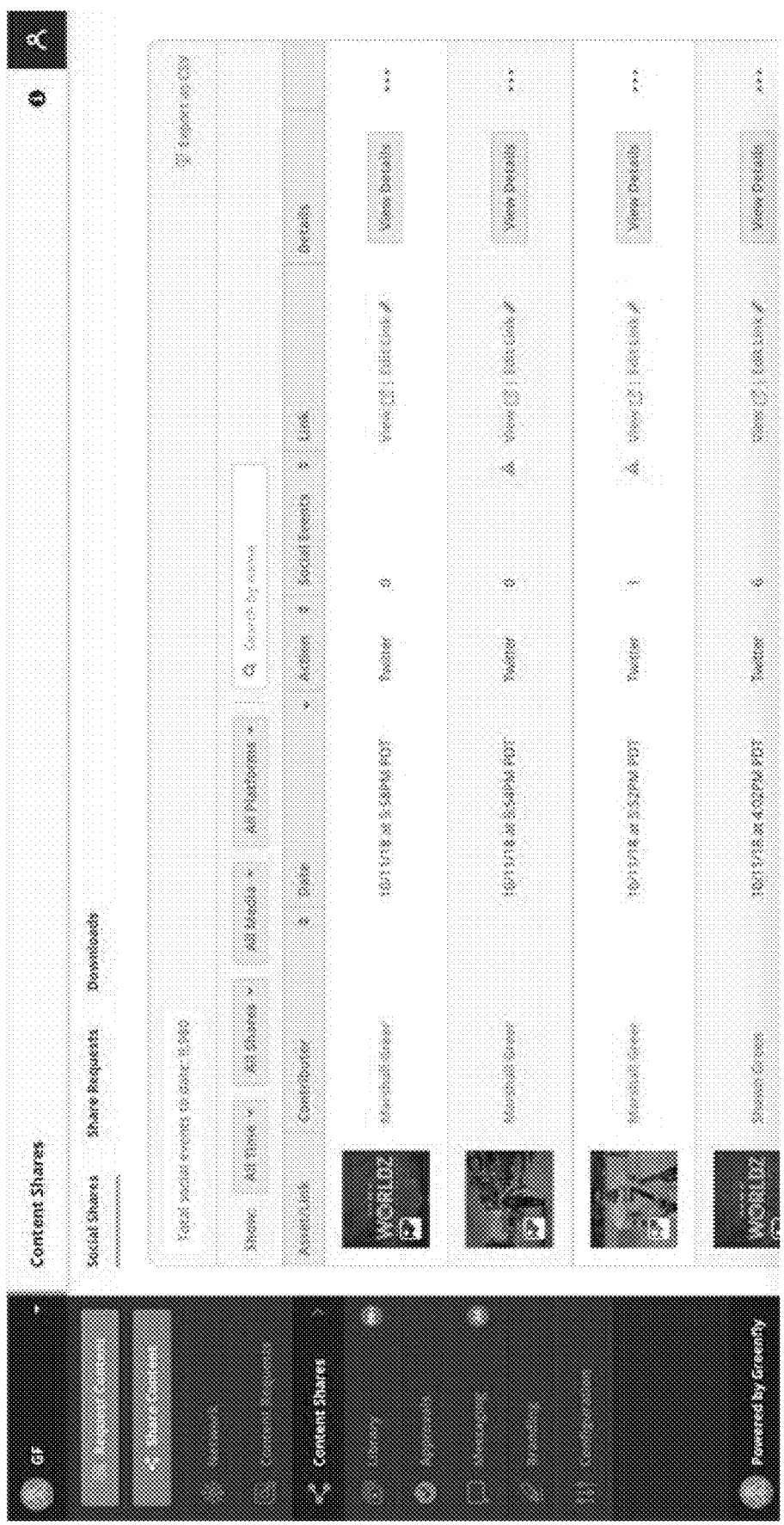

FIG. 7C illustrates an example social sharing analytics user interface presenting information accessed by the content distribution and secure storage system from its own content sharing and interaction records, as well as from records accessed via application programming interfaces from one or more third party systems (e.g., social network platform systems or other content sharing platforms). For example, certain data may be tracked by scrapping data various networked resources, such as content sharing platforms (e.g., social network sites, image sharing platforms, etc.).

The user interface includes a social sharing table including the following columns for a different content item:
  asset/link (which may display content items or content item links);
  contributor (which includes a contributor name/identifier);
  date (date of content creation or upload);
  action (e.g., the social network platform via which the content item was shared);
  social events (number of social events relating to the content, such as number of shares, views, likes, plays, etc.);
  link (a link, such as a URL, to the content), with link edit and content view controls
  details.

A total/aggregated social events number may be reported via the user interface for all of the content items.

Filter controls may be provided (e.g., via drop down menus) via which the user can have the system filter the sharing data displayed by the content sharing table. For example, the filter may enable the user to specify a time period (e.g., all time, previous month, previous day, current day, a specified start-end period, etc.), the types of shares, the types of content media shares, and the sharing platforms (e.g., FACEBOOK, TWITTER, INSTAGRAM, SNAPCHAT, etc.) for which data is to be reported (thereby more efficiently using display real estate).

A search field may be provided via which the user can search for content share data for a given content item by name.

A menu on the left provides access to other user interfaces, such as a request content user interface, a share content user interface, a network user interface, a content requests user interface (which provides a list of existing content requests), the content shares user interface, a content library user interface, a content approval user interface, a content contributor messaging user interface, a branding user interface, and a configuration user interface. This menu may be included in each of the foregoing user interfaces to provide quick and reliable access to a desired user interface.

Figure 7D:
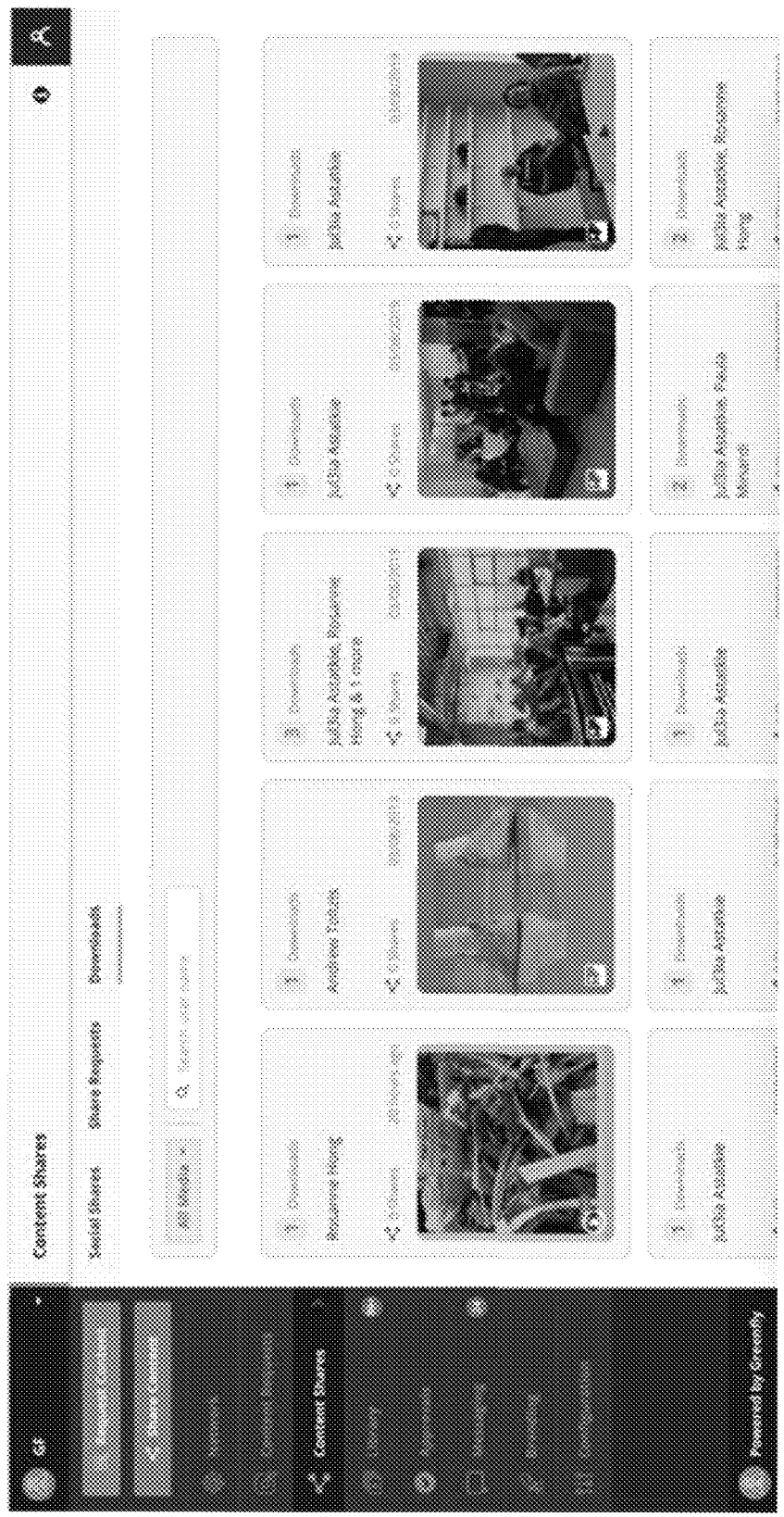

FIG. 7D illustrates an example content downloads analytics user interface presenting information regarding the download of content. The user interface displays various content items, the name/identifier of the content contributor, the number of times each content item has been downloaded from the system to user devices, the number of times the content item has been shared (e.g., via one or more social networking platforms or other content sharing platforms), and when the content item was last downloaded and/or shared. A search field is provided via which a user may submit a content search query.

Figure 7E:
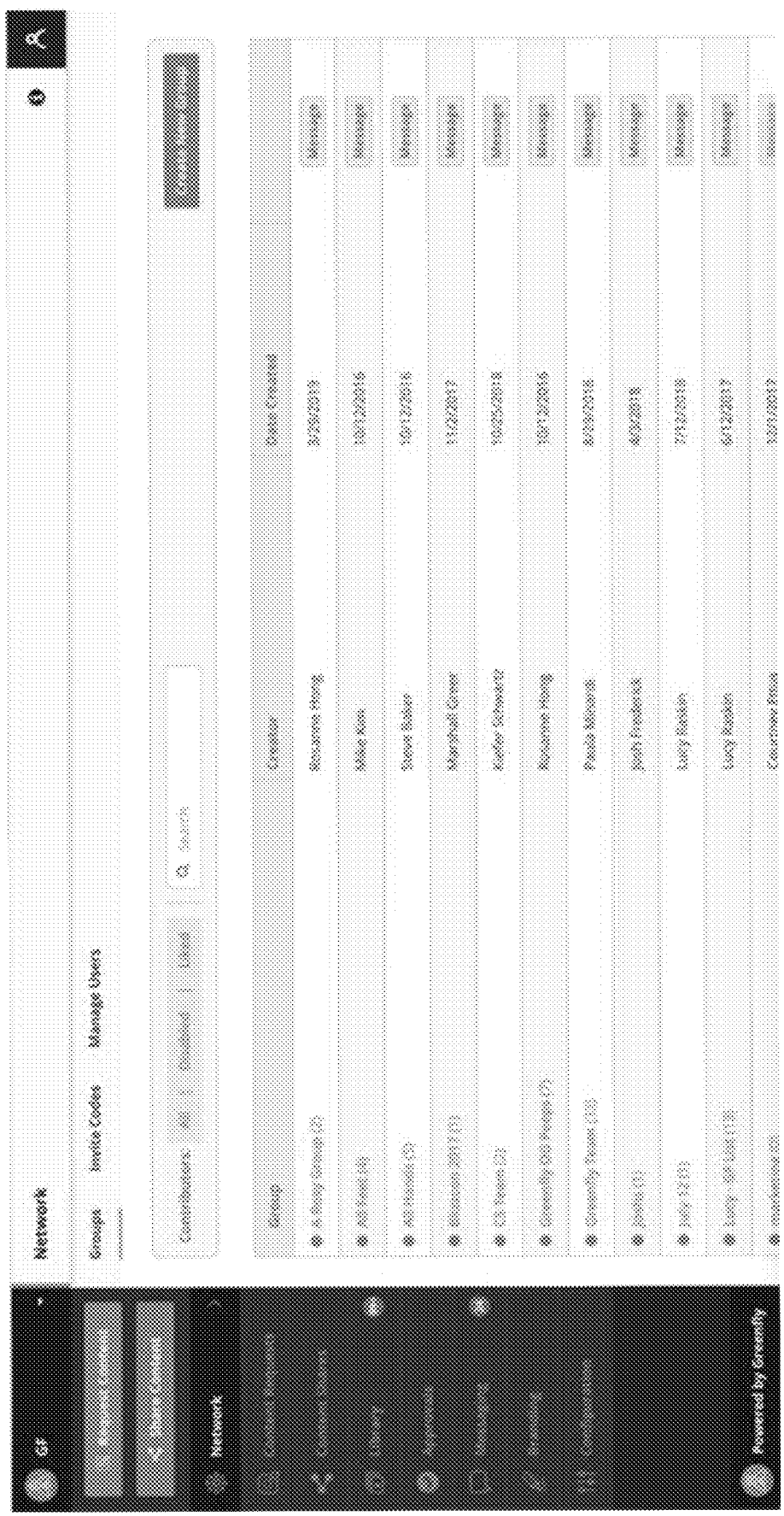

FIG. 7E illustrates an example group/community definition and reporting user interface. The user interface includes a table including a group column (listing the group names), a group creator column (listing the name/identifier of the user that created the group), and a group creation date column. The user may select a group and in response the group detail example user interface illustrated in FIG. 7F may be presented. A message control is provided in association with each group, which when activated causes a chat interface to be presented. The chat interface may be used to communicate with all members of the group at once (or individual group members). For example, the chat interface may be used to transmit content requests or comments on submitted content, in real time, to group members. A filter control is provided which enables the user to filter the displayed data to all contributors, disabled contributors, and/or liked contributors. A group creation control is provided via which the user can define groups and assign group members to groups. Links are provided to user interfaces via which the user can cause invitations to be sent to users to join a specified group and via which users can be managed. A search user interface is provided via which a user can enter a search query as similarly discussed elsewhere herein.

Figure 7F:
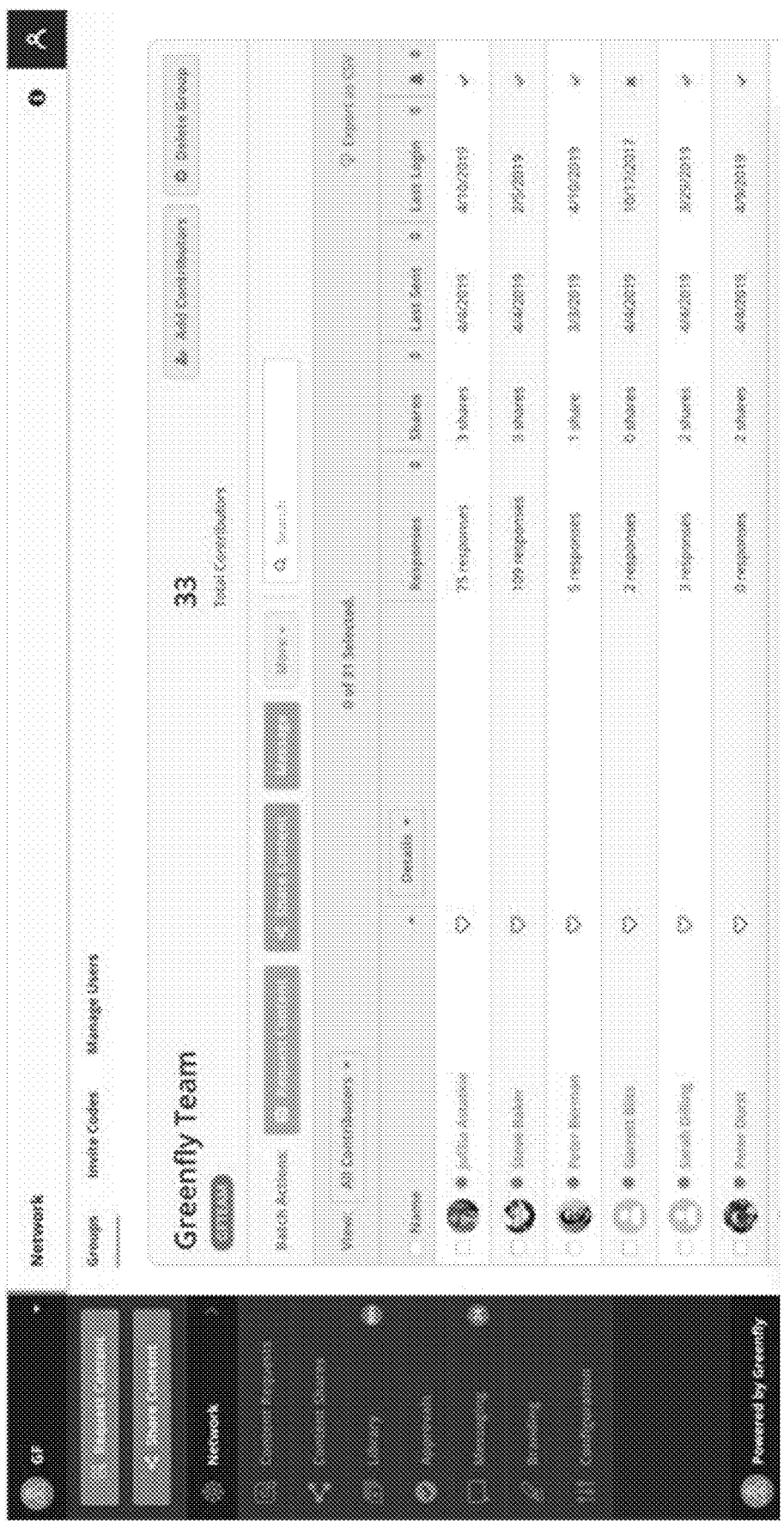

FIG. 7F illustrates an example group detail user interface. The illustrated user interface includes a group member column (listing the names/identifiers of group members), a like control column (including like controls via which a user can provide a like indication for a given group member), a responses column (indicating how may responses the group member has provided in response to content requests), a shares column (indicating the number of content shares for the group member), a last sent (indicating the date a content item was last submitted by the group member or the date when the group member last submitted an item of content). A view filter is provided via which the user can filter the group members listed (e.g., all group member contributors, the top 10 contributors, the 10 contributors that have most recently submitted content, etc.). Batch action controls are provided for requesting content, sharing content, and transmitting messages. A control is provided via which the user can add members to the group or delete members from the group. A group delete control is provided via which the user can delete the group.

Figure 7G:
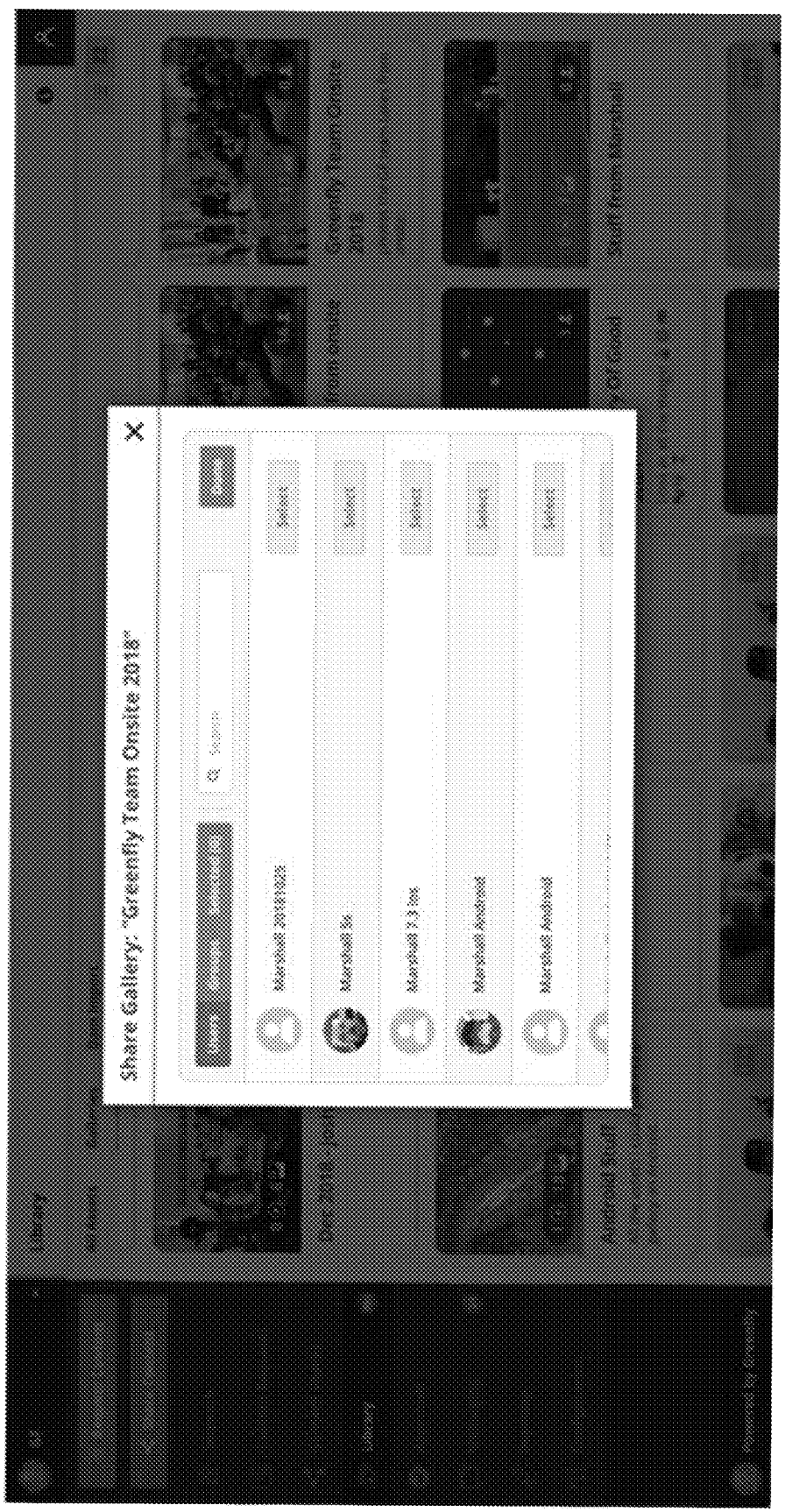

FIG. 7G illustrates an example gallery sharing user interface via which the user can select individual users with whom a selected gallery is to be shared. An indicator may be provided reporting the number of users selected. A similar interface may be provided in response to the user activating a group control via which the user can select groups with whom a selected gallery is to be shared. The user or group sharing user interface may be presented as a pop-up overlaying the gallery library interface (which displays content galleries) in response to the user selecting a share gallery control for a given gallery.

Figure 7H:
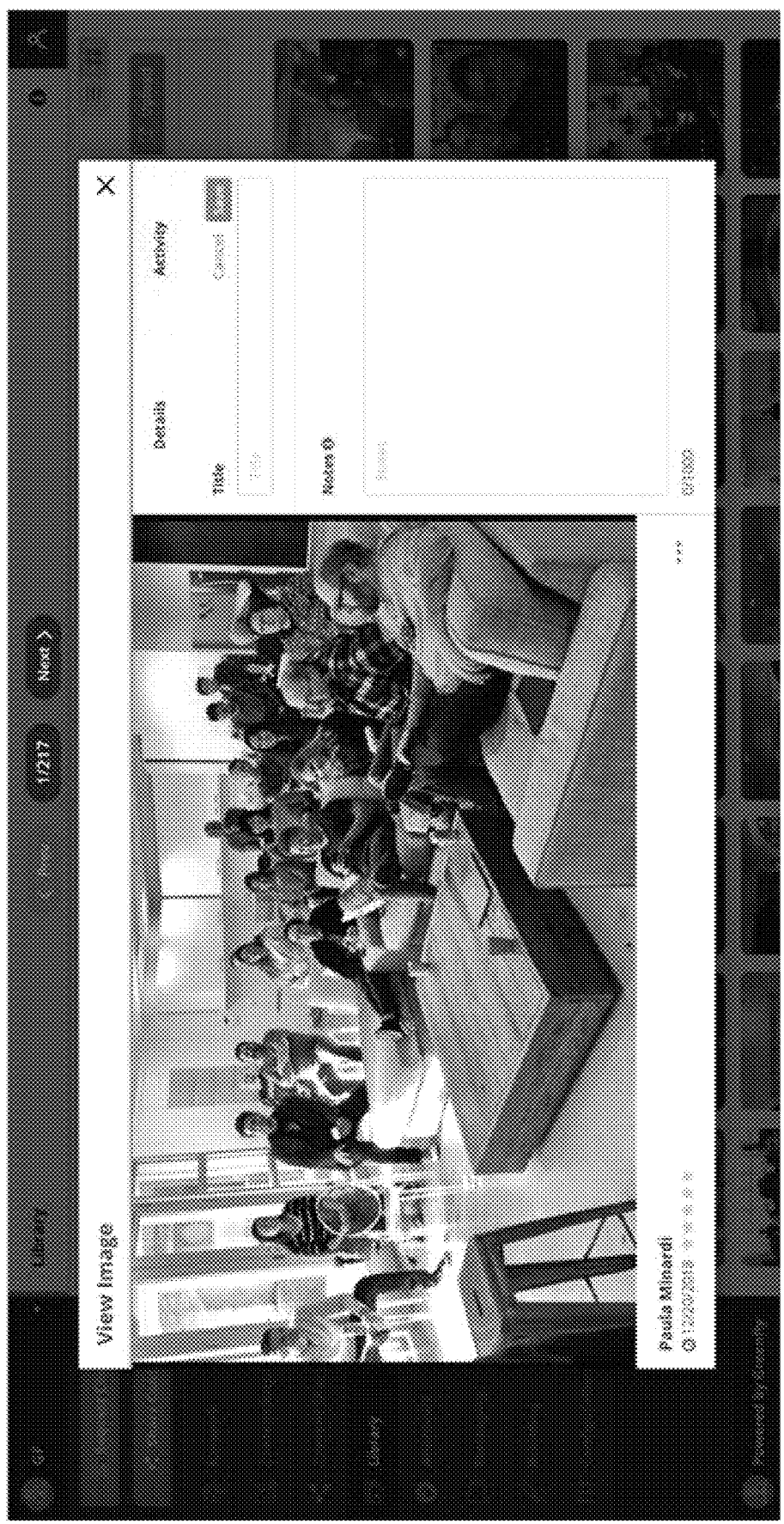
Figure 71:

In response to the user selecting a content item (e.g., a still or video image) in a gallery, the example content view user interface illustrated in FIG. 7H may be presented. In this example, the content item, the name/identifier of the contributing user, the date of the image creation of submission, and a rating (e.g., provided by a gallery administrator or other authorized user) are displayed. Fields are provided via which an authorized user may enter a content title and notes (e.g., text notes). In response to activation of a save control, the title and notes may be saved as metadata in association with the content item. Controls are provided via which the user can navigate to a new or previous content item. The total number of content items in the gallery may be displayed, with a number indicating the position of the current content item (e.g., 1 of 217 content items).

FIG. 7I illustrates an example gallery view of gallery contents presented in response to a user selection of a gallery via the gallery library user interface. The example user interface is configured to be displayed on a mobile device display (e.g., a smart phone or tablet display). The user interface indicates the gallery name, with a dropdown menu that enables a user to filter the content items displayed based on subject metadata associated with the content items. (e.g., people, cats, dogs). A person icon indicates how many users are part of the gallery community. A camera icon is provided, which when activated, causes a viewfinder with a shutter control to be presented, presenting a view from the user device camera. The user may activate a shutter in order to capture a photograph or video, which may then be uploaded or assigned to a gallery.

FIG. 7J illustrates a user interface presenting a content item selected via the user interface of FIG. 7I. The content item is presented in association with the name and image of the user that contributed the content item. A share control is provided, which when activated, enables the user to share the content item via SMS, email, one or more social network platforms or other content sharing platforms, or otherwise.

Thus, an aspect of the present disclosure relates to systems and processes that enable users to securely share information and content over a network. Such shared information and content may be instantly distributed over one or more distribution channels and platforms to one or more user devices. The content may also be securely stored in a repository.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., comprising databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used. Processes described as being performed by a given system may be performed by a user terminal or other system or systems. Processes described as being performed by a user terminal may be performed by another system. Data described as being accessed from a given source may be stored by and accessed from other sources. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app"), such as a dedicated app configured specifically for social networking and/or communications activities, installed on the user's mobile phone, laptop, pad, desktop, television, set top box, phone, or other terminal. For example, an app may be downloaded to a user mobile device, such as a smart phone. Various features described or illustrated as being present in different embodiments or user interfaces may be combined into the same embodiment or user interface.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. Non-transitory storage media having stored thereon executable program instructions configured to direct a computer system to perform operations comprising:
    receive an invitation to join a first content sharing group;
    detect an action of a user corresponding to acceptance of the invitation to join the first content sharing group;
    at least partly in response to the detected user action corresponding to acceptance of the invitation to join the first content sharing group, cause an acceptance indication to be transmitted to a remote system;
    in response to at least one communication from the remote system, cause a first content gallery comprising a gallery of images to be instantiated on the computer system;
    enable a thumbnail of an image included in the first content gallery instantiated on the computer system in response to at least one communication from the remote system to be rendered as a representation of the first content gallery, wherein user selection of the thumbnail causes images included in the first content gallery to be displayed;
    enable a number to be rendered in association with the thumbnail of an image included in the first content gallery rendered as a representation of the first content gallery, the number corresponding to a quantity of content items included in the first content gallery;
    receive a new content item in association with an indication that the new content item is associated with the first content gallery;
    enable an updated number to be rendered in association with the thumbnail of an image included in the first content gallery rendered as a representation of the first content gallery, the updated number reflecting the association of the new content item with the first content gallery;
    receive a user selection of the representation of the first content gallery;
    in response to the user selection of the thumbnail of an image included in the first content gallery, comprising the associated new content item, rendered as a representation of the first content gallery, cause at least a portion of the content items associated with the first content gallery to be rendered;
    receive a content request comprising text from the remote system;
    cause the content request comprising text from the remote system to be rendered;
    receive a user provided content item, wherein the user provided content item is provided in response to the rendered content request comprising text; and
    cause the user provided content item to be transmitted in association with an identification of the rendered content request.

2. The non-transitory storage media as defined in claim 1, wherein the program instructions are further configured to direct the computer system to render a user interface comprising a plurality of controls enabling the user to share at least one content item with respective content sharing platforms, the content sharing platforms comprising at least an image sharing platform and a social networking platform.

3. The non-transitory storage media as defined in claim 1, wherein the program instructions are further configured to direct the computer system to:
    provide a user interface comprising a plurality of controls enabling the user to share at least one content item with respective content sharing platforms;
    detect a user share of at least one content item via one or more of the content sharing platforms; and
    transmit a message to the remote system indicating what content items were shared and the content sharing platforms with which the content items were shared with.

4. The non-transitory storage media as defined in claim 1, wherein the program instructions are further configured to direct the computer system to:
    render a search user interface;
    receive, via the search user interface, one or more search terms;
    provide the one or more search terms to a search engine, the search engine configured to identify corresponding content item galleries, content items, and/or content item contributors;
    receive search results from the search engine, the search results comprising the identified corresponding content item galleries, content items, and/or content item contributors; and
    cause the search results to be rendered.

5. The non-transitory storage media as defined in claim 1, wherein the program instructions are further configured to direct the computer system to:
    render a content item editing user interface, the content item editing user interface comprising editing tools enabling:
    content cropping,
    content color correction,
    content rotation,
    adding of a graphic stamp to content,
    associating metadata with content.

6. The non-transitory storage media as defined in claim 1, wherein content items associated with the first content gallery comprises both still images and video images.

7. The non-transitory storage media as defined in claim 1, wherein detecting the user action corresponding to acceptance of the invitation to join the first content sharing group comprises receiving a first alphanumeric code.

8. A computer implemented method comprising:
receiving, over a wireless network at a first user device, a communication regarding a first content sharing group;
detecting, using a content sharing application installed on the first user device, an action of a user with respect to the communication regarding the first content sharing group;
at least partly in response to the detected user action with respect to the communication regarding the first content sharing group, causing, by the content sharing application, an acceptance indication to be transmitted to a remote system;
in response to a communication from the remote system, causing a first content gallery comprising images, using the content sharing application installed on the first user device, to be instantiated on the first user device;
enabling, using the content sharing application installed on the first user device, a version of an image included in the first content gallery to be rendered as a representation of the first content gallery, wherein user selection of the version of the image causes images included in the first content gallery to be displayed;
enabling, using the content sharing application installed on the first user device, a quantity indicator to be rendered in association with the version of an image included in the first content gallery rendered as a representation of the first content gallery, the quantity indicator corresponding to a quantity of content items included in the first content gallery;
receiving, using the content sharing application installed on the first user device, a new content item in association with an indication that the new content item is associated with the first content gallery;
enabling, using the content sharing application installed on the first user device, an updated quantity indicator to be rendered in association with the version of an image included in the first content gallery rendered as a representation of the first content gallery, the updated quantity indicator reflecting the association of the new content item with the first content gallery;
receiving, using the content sharing application installed on the first user device, a user selection of the version of an image included in the first content gallery rendered as a representation of the first content gallery;
in response to the user selection of the version of an image included in the first content gallery rendered as a representation of the first content gallery associated with the new content item, causing content items associated with the first content gallery to be rendered;
receiving, using the content sharing application installed on the first user device, a content request comprising text from the remote system;
causing, using the content sharing application installed on the first user device, the content request comprising text from the remote system to be rendered;
receiving, using the content sharing application installed on the first user device, a user provided content item, wherein the user provided content item is provided in response to the rendered content request comprising text; and
causing, using the content sharing application installed on the first user device, the user provided content item to be transmitted in association with an identification of the content request.

9. The computer implemented method as defined in claim 8, the method further comprising rendering a user interface comprising a plurality of controls enabling the user to share at least one content item with respective content sharing platforms, the content sharing platforms comprising at least an image sharing platform and a social networking platform.

10. The computer implemented method as defined in claim 8, the method further comprising:
providing a user interface comprising a plurality of controls enabling the user to share at least one content item with respective content sharing platforms;
detecting a user share of at least one content item via one or more of the content sharing platforms; and
transmitting a message to the remote system indicating what content items were shared and the content sharing platforms with which the content items were shared with.

11. The computer implemented method as defined in claim 8, the method further comprising:
rendering a search user interface;
receiving, via the search user interface, one or more search terms;
providing the one or more search terms to a search engine, the search engine configured to identify corresponding content item galleries, content items, and/or content item contributors;
receiving search results from the search engine, the search results comprising the identified corresponding content item galleries, content items, and/or content item contributors; and
causing the search results to be rendered.

12. The computer implemented method as defined in claim 8, the method further comprising:
rendering a content item editing user interface, the content item editing user interface comprising editing tools enabling:
content cropping,
content color correction,
content rotation,
adding of a graphic stamp to content,
associating metadata with content.

13. The computer implemented method as defined in claim 8, wherein content items associated with the first content gallery comprises both still images and video images.

14. The computer implemented method as defined in claim 8, wherein detecting the user action corresponding with respect to the communication regarding the first content sharing group comprises receiving a first alphanumeric code.

15. A system, the system comprising:
a computer system comprising one or more computing devices;
a network interface; and
a computer storage system comprising a non-transitory storage device, said computer storage system having stored thereon executable program instructions that direct the computer system to at least:
receive, a communication regarding a first content sharing group;
detect an action of a user with respect to the communication regarding the first content sharing group;

at least partly in response to the detected user action with respect to the communication regarding the first content sharing group, cause an acceptance indication to be transmitted to a remote system;

in response to a communication from the remote system, cause a first content gallery comprising images to be instantiated on a first user device;

enable a version of an image included in the first content gallery to be rendered as a representation of the first content gallery, wherein user selection of the version of the image causes images included in the first content gallery to be displayed;

enable a quantity indicator to be rendered in association with the version of an image included in the first content gallery rendered as a representation of the first content gallery, the quantity indicator corresponding to a quantity of content items included in the first content gallery;

receive a new content item in association with an indication that the new content item is associated with the first content gallery;

enable using a content sharing application installed on the first user device, an updated quantity indicator to be rendered in association with the version of an image included in the first content gallery rendered as a representation of the first content gallery, the updated quantity indicator reflecting the association of the new content item with the first content gallery;

receive a user selection of the version of an image included in the first content gallery rendered as a representation of the first content gallery;

in response to the user selection of the version of an image included in the first content gallery rendered as a representation of the first content gallery associated with the new content item, cause content items associated with the first content gallery to be rendered;

receive a content request comprising text from the remote system;

cause the content request comprising text from the remote system to be rendered;

receive a user provided content item, wherein the user provided content item is provided in response to the rendered content request comprising text; and cause the user provided content item to be transmitted in association with an identification of the content request.

16. The system as defined in claim 15, the operations further comprising rendering a user interface comprising a plurality of controls enabling the user to share at least one content item with respective content sharing platforms, the content sharing platforms comprising at least an image sharing platform and a social networking platform.

17. The system as defined in claim 15, the operations further comprising:
providing a user interface comprising a plurality of controls enabling the user to share at least one content item with respective content sharing platforms;
detecting a user share of at least one content item via one or more of the content sharing platforms; and
transmitting a message to the remote system indicating what content items were shared and the content sharing platforms with which the content items were shared with.

18. The system as defined in claim 15, the operations further comprising:
rendering a search user interface;
receiving, via the search user interface, one or more search terms;
providing the one or more search terms to a search engine, the search engine configured to identify corresponding content item galleries, content items, and/or content item contributors;
receiving search results from the search engine, the search results comprising the identified corresponding content item galleries, content items, and/or content item contributors; and
causing the search results to be rendered.

19. The system as defined in claim 15, the operations further comprising:
render a content item editing user interface, the content item editing user interface comprising editing tools enabling:
content cropping,
content color correction,
content rotation,
adding of a graphic stamp to content,
associating metadata with content.

20. The system as defined in claim 15, wherein content items associated with the first content gallery comprises both still images and video images.

* * * * *